(12) United States Patent
Gaudry

(10) Patent No.: US 9,307,771 B2
(45) Date of Patent: Apr. 12, 2016

(54) METHODS AND SYSTEMS FOR INHIBITING LEAKAGE BETWEEN A SURFACE AND A SHAPING OBJECT

(71) Applicant: Katherine S Gaudry, Centennial, CO (US)

(72) Inventor: Katherine S Gaudry, Centennial, CO (US)

( * ) Notice: Subject to any disclaimer, the term of this patent is extended or adjusted under 35 U.S.C. 154(b) by 679 days.

(21) Appl. No.: 13/633,131

(22) Filed: Oct. 2, 2012

(65) Prior Publication Data

US 2013/0022721 A1    Jan. 24, 2013

Related U.S. Application Data

(63) Continuation-in-part of application No. 12/413,509, filed on Mar. 27, 2009, which is a continuation-in-part of application No. PCT/US2008/079765, filed on Oct. 14, 2008.

(60) Provisional application No. 61/560,805, filed on Nov. 17, 2011, provisional application No. 61/029,839, filed on Feb. 19, 2008, provisional application No. 60/991,408, filed on Nov. 30, 2007, provisional application No. 60/980,392, filed on Oct. 16, 2007.

(51) Int. Cl.
*A21B 5/00*     (2006.01)
*A21B 3/13*     (2006.01)
*A21D 13/08*    (2006.01)
*C11C 5/02*     (2006.01)

(52) U.S. Cl.
CPC . *A21B 3/13* (2013.01); *A21D 13/08* (2013.01); *C11C 5/023* (2013.01)

(58) Field of Classification Search
CPC .................... A21B 3/131; A21B 3/138
See application file for complete search history.

(56) References Cited

U.S. PATENT DOCUMENTS

| 4,156,516 A * | 5/1979 | Oliver ........... A21B 3/15 249/139 |
| 5,968,577 A * | 10/1999 | Roecker ........... A21B 3/13 126/152 R |
| 7,913,970 B2 * | 3/2011 | Bennet ........... A21B 3/137 229/123.2 |

\* cited by examiner

*Primary Examiner* — James Sanders

(57) ABSTRACT

In some embodiments of the invention, systems and methods relate to a container formed by a compressible mat and flexible strip. The strip can be formed into a closed shape, positioned on top of the compressible mat and pressed into the mat. A crevice can thereby be formed along a bottom edge of the strip. The crevice can prevent material poured into the formed closed area from leaking underneath the strip.

20 Claims, 14 Drawing Sheets

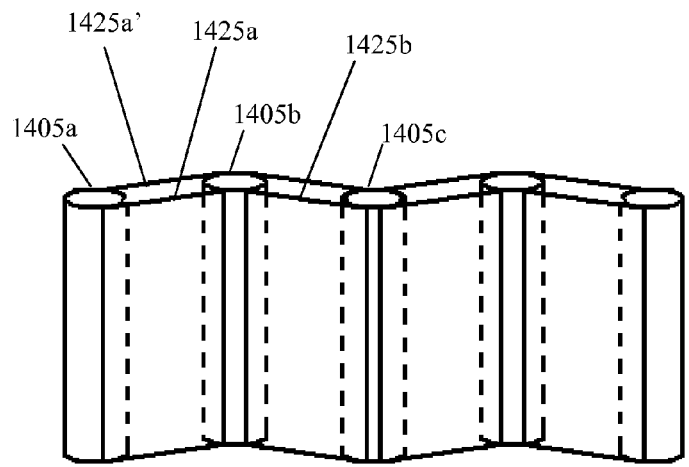
FIGURE 14F
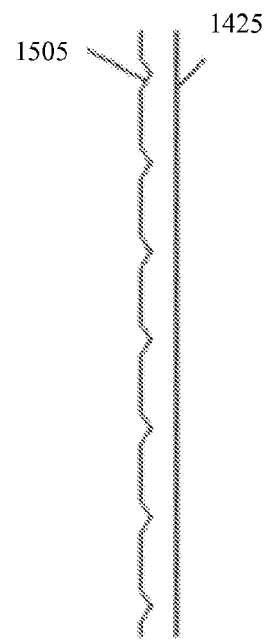
FIGURE 15A
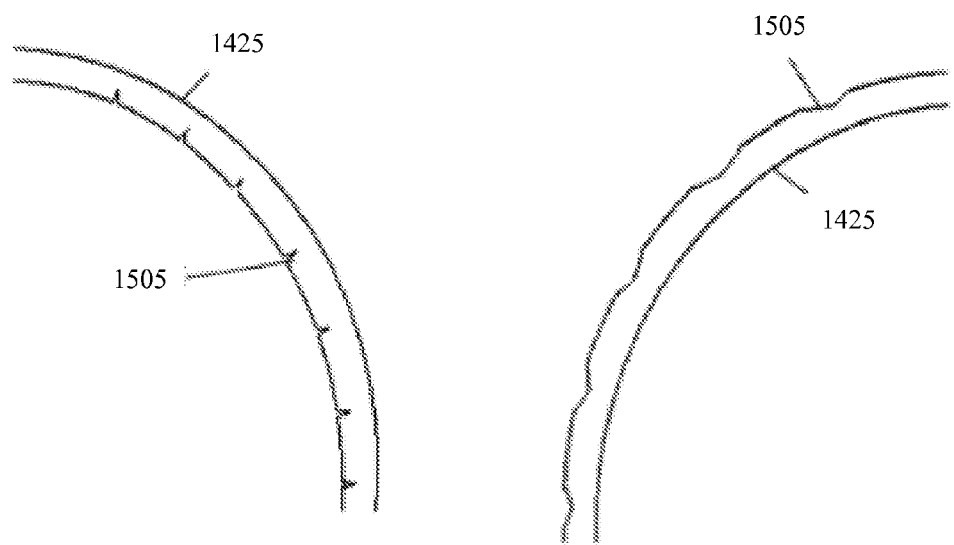
FIGURE 15B
FIGURE 15C

METHODS AND SYSTEMS FOR INHIBITING LEAKAGE BETWEEN A SURFACE AND A SHAPING OBJECT

CROSS-REFERENCE TO RELATED APPLICATIONS

This application claims the benefit and priority of U.S. Provisional Application No. 61/560,805, filed on Nov. 17, 2011. This application is also a continuation-in-part of Ser. No. 12/413,509, filed on Mar. 29, 2007, which is a continuation-in-part of PCT/US08/79765, filed on Oct. 14, 2008, which claims the benefit and priority of U.S. Provisional Patent Application No. 61/029,839, filed on Feb. 19, 2008; U.S. Provisional Patent Application No. 60/991,408, filed on Nov. 30, 2007; and U.S. Provisional Patent Application No. 60/980,392, filed on Oct. 16, 2007. Each of the above-listed applications is hereby incorporated by reference in its entirety for all purposes.

BACKGROUND

Frequently, containers are of a fixed shape. The container's surface can thus be continuous. This continuity can prevent materials that will fill the container from leaking through gaps (e.g., created in response to force exerted by the material). However, the fixed shape also carries disadvantages. For example, the container's utility may be limited to instances in which a precise size or shape of the container is appropriate. Further, storing the container may require a substantial amount of space. Thus, it would be advantageous to provide an apparatus or system that can reliably contain materials while extending its flexibility in its potential utilization.

SUMMARY

In some embodiments of the invention, systems and methods relate to a flexible strip that can be formed into a closed shape and positioned on top of a compressible mat. The strip can be pressed into the compressible mat such that a crevice is formed along a bottom edge of the strip. The crevice can prevent material poured into the formed closed area from leaking underneath the strip.

In some embodiments of the invention, systems and methods allow a user to make a food item (e.g., a cake) in a custom shape. For example, a user may arrange one or more objects (e.g., a strip or blocks) on a surface to at least partly define a perimeter. A non-solid food item (e.g., cake batter) may be poured inside the perimeter and baked. After baking, the baked food item (e.g., cake) may have a shape similar to the perimeter. In order to prevent the non-solid food item from leaking through the perimeter, a leak-proof boundary may be formed between the perimeter and the surface. For example, the surface may include a mat (e.g., a shapeable, compressible, deformable, substantially non-resilient, semi-adhesive and/or adhesive mat). A user may press the perimeter into the mat and/or compress an area within the perimeter. Leakage of the food item may be inhibited (e.g., due to a seal between the object and the mat and/or due to a relatively high surface of a portion of the mat outside the perimeter).

In some embodiments, a method for processing a liquid is provided. A cake-shaping object (e.g., a flexible strip with a set of vertical supports) can be positioned along a perimeter of the region. A region of a compressible mat can be compressed. A liquid (e.g., a cake batter) can be poured over the compressed region. The liquid and the mat can be subjected to a processing (e.g., baking). The processing can transform the liquid into a solid (e.g., a cake). The processed liquid can be separated from the mat. The processed liquid can include a shape similar to the compressed region. The compressible mat can include aluminum and/or can be compressible at least partly due to a packing of a material.

In some embodiments, a system for baking a cake is provided. The system can include a flexible strip configured to be bent by hands of a user from an initial shape into a subsequent shape. The system can also include a compressible mat configured to be locally compressed, such that, upon the user applying a downwards force on the flexible strip when an edge of the flexible strip is positioned on the mat, a portion of the mat under the edge compresses thereby forming a crevice in the mat. The flexible strip can include a set of vertical supports. The positions of the vertical supports relative to each other when the flexible strip is in the initial shape can be different than positions of the vertical supports relative to each other when the flexible strip is in the subsequent shape. A surface of the flexible strip can be food-safe, and a surface of the compressible mat can be food safe. A width of the crevice can be at least about 0, 0.1, 0.25, 0.5 or 1 cm wider and less than about 1, 2, 3 or 5 cm wider than a thickness of the flexible strip. The subsequent shape can be a closed shape. The compressible mat can be further configured to be compressed, such that, upon the user applying a downwards force on a top surface of the mat along an area inside the closed shape, a second portion of the mat corresponding to the area is compressed. A difference between a height of a second portion of the mat and a height of the first portion of the mat can be 0.25-5 cm, the second portion of the mat being uncompressed.

In some embodiments, a flexible strip for making a cake in a desired shape is provided. The strip can include a top portion with a first height and first thickness. Each of the first height and the first thickness can remain unchanged upon a user applying, by hand, downwards force on the flexible strip, the flexible strip being positioned on a underlying surface when the downwards force is applied. The strip can also include a bottom portion with a second height and second thickness. Upon the user applying, by hand, the downwards force on the flexible strip, the second height can decrease and the second thickness can increase. The flexible strip can be configured to be bent by hands of a user from an initial shape into a subsequent shape. The flexible strip is edge supporting such that it remains stably shaped in the subsequent shape after being bent. Each of a surface of the top portion and a surface of the bottom portion can be food safe The top portion can include a plurality of vertical supports. Upon the user applying, by hand, the downwards force on the flexible strip, the second height can decrease by at least 0.1, 0.25 cm, 0.5 cm, 1 cm, 2 cm or 5 cm. The top portion can be in direct contact with the bottom portion. Upon the user applying, by hand, the downwards force on the flexible strip, the increase of the second thickness can increase contact between the flexible strip and the underlying surface, thereby deterring liquid from flowing underneath the flexible strip.

BRIEF DESCRIPTION OF THE DRAWINGS

FIGS. 14A-14F illustrate examples of at least part of a strip, according to some embodiments of the invention.

FIGS. 15A-15C illustrate examples of an outside grooved layer, according to some embodiments of the invention.

DETAILED DESCRIPTION

Figure 1A:
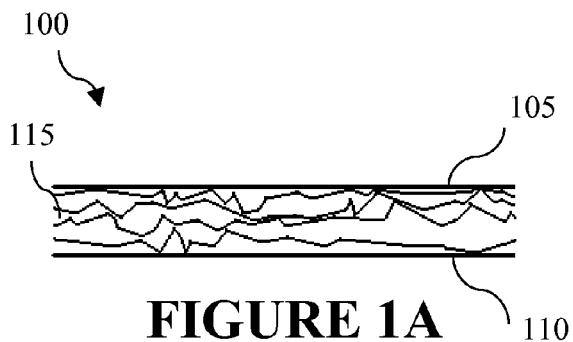
FIGS. 1A-1H illustrate examples of compressible mats, according to some embodiments of the invention.

In some embodiments of the invention, systems and methods allow a user to make a food item (e.g., a cake) in a custom shape. For example, a user may arrange one or more objects (e.g., a strip or blocks) on a surface to at least partly define a perimeter. A non-solid food item (e.g., cake batter) may be poured inside the perimeter and baked. After baking, the baked food item (e.g., cake) may have a shape similar to the perimeter. In order to prevent the non-solid food item from leaking through the perimeter, a leak-proof boundary may be formed between the perimeter and the surface. For example, the surface may include a mat (e.g., a shapeable, compressible, deformable, substantially non-resilient, semi-adhesive and/or adhesive mat). A user may press the perimeter into the mat and/or compress an area within the perimeter. Leakage of the food item may be inhibited (e.g., due to a seal between the object and the mat and/or due to a relatively higher surface of a portion of the mat outside the perimeter).

The mat may be of any of a variety of shapes. For example, the mat may be substantially rectangular, substantially square, substantially circular, etc. The mat may be, e.g., at least about, about or less than about 1, 3, 6, 12, 18, 24, 36 or 48 inches wide and/or long (e.g., about 6-36 inches wide and about 6-36 inches long). In some embodiments, the mat extends across an area slightly smaller than, approximately equal to, or slightly larger than a base of a standard size cake pan or cookie sheet (e.g., the mat may be substantially rectangular and slightly smaller/larger than 26×18 inches, 21×15 inches, 18×13 inches or 13×9 inches, or the mat may be circular with a diameter slightly smaller/larger than 8, 9 or 10 inches). The mat may have a depth (which may comprise an uncompressed depth) of at least about, about or less than about 0.1, 0.25, 0.5, 1, 2, 3, 5 or 10 inches. For example, the mat may have an uncompressed depth of at least 0.5 inches and be configured such that a fully compressed depth is less than 0.5 inches or less than 0.25 inches. In some embodiments, the mat has a (e.g., maximal) width and/or a (e.g., maximal) length of about 5-36 inches or about 8-24 inches and/or has an uncompressed depth of about 0.5-2 inches or about 0.5-1 inch.

A mat may or may not be provided separately from a supporting surface. For example, a mat may be physically independent (and/or provided or sold independently) from a supporting surface, such as a cookie sheet or cake pan. As another example, a mat may be physically independent from a supporting surface, but the mat and surface may be provided together (e.g., a mat may be sold with a cookie sheet). As another example, a mat may be physically coupled with a supporting surface or the supporting surface may be configured to include the mat and/or have properties described herein in relation to the mat. For example, a product may resemble a cookie sheet or cake pan but have a mat fixedly attached to its top surface (e.g., where cookies or cake batter would be positioned) or have a top surface that includes one or more properties described herein with respect to a mat (e.g., such that the top surface is compressible). In some embodiments, a mat as described herein may be manufactured to be a stand-alone product (e.g., such that cake-shaping objects and food items may be placed on the mat and transported without the mat collapsing or disturbing the objects placed thereon). A mat may or may not include solid and rigid sidewalls, bottom surface, handles, etc. that may assist in stand-alone functionality.

In some embodiments, the mat is compressible, shapeable and/or deformable and has a depth that decreases upon compression. For example, downwards force applied to a top surface of the mat may decrease the depth of the mat, e.g., by at least 3%, 5%, 10%, 20%, 40%, 60% or 80% of its initial depth or by at least 0.1, 0.25, 0.5, 1, 2, 3 or 5 centimeters. Compression, shaping and/or deformation of the mat may be temporary, semi-permanent or permanent. For example, in one embodiment, after the mat is compressed, it is difficult to impossible to restore the mat to a non-compressed state (e.g., height). Thus, e.g., it may be necessary to obtain a new mat when a user wishes to compress the mat into a different shape. As another example, it may be possible for the mat to be restored to a semi-original state (e.g., by having a user push upwards on a portion of the mat, pull horizontally on sides of the mat, or let the mat sit for a period of time to allow a slow resilience to take effect). This restoration may produce a restored mat that is nearly identical to an original uncompressed mat or sufficiently restored to allow for the mat to be used again for a new shape. In some embodiments, the mat is substantially non-compressible, non-deformable and/or non-shapeable. For example, the mat may have a fixed and uniform thickness or depth.

The mat may be compressible, shapeable and/or deformable, e.g., due to one, more or all of the types of materials composing part or all of the mat, and/or due to a packing and/or shape or contour of one, more or all of the types of materials within part or all of the mat. For example, FIGS. 1A-1D illustrate a mat 100 having a top layer 105, a bottom layer 110 and an interior layer 115 (e.g., a compressible interior layer). One or more layers (e.g., top and bottom layers 105 and 110 or a top-most and bottom-most layer, such as a thin silicone layer) may be contiguous with each other (e.g., forming a sack or casing) or may not. In some embodiments, no top layer 105 and/or no bottom layer 110 is included in the mat. In some instances, mat 100 consists only of a single layer (e.g., of substantially uniform composition).

Top layer 105 and/or bottom layer 110 may be, e.g., solid, deformable, at least partly stretchable and/or substantially non-compressible. Top layer 105 and/or bottom layer 110 may have a thickness (i.e., depth) of at least about, about or less than about 0.001, 0.01, 0.1, 0.5, 1, 2, 3 or 5 cm. In one embodiment, top layer 105 has a thickness of less than 1 cm and bottom layer 110 may have a thickness of more than 0.5 cm. Interior layer 115 may be compressible and/or deformable. Interior layer 115 may be configured, e.g., such that a line or shape may be indented into a region of the layer. Interior layer 115 may have a non-compressed average thickness of at least about, about or less than about 0.001, 0.01, 0.1, 0.5, 1, 2, 3, 5, 10 or 20 cm (e.g., about 0.5-2 cm). In some embodiments, interior layer 115 is, while in an uncompressed state, on average, at least about 2, 5, 10, 20, 50, 100, 500 or 1,000 times thicker than top layer 105 and/or bottom layer 115.

Figure 1E:
Figure 1B:
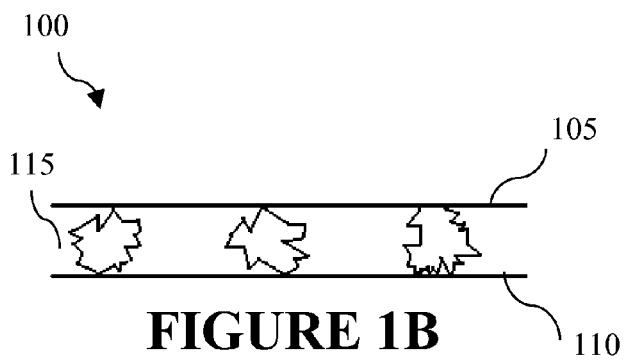
Figure 1F:
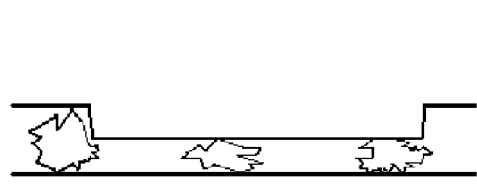
Figure 1C:
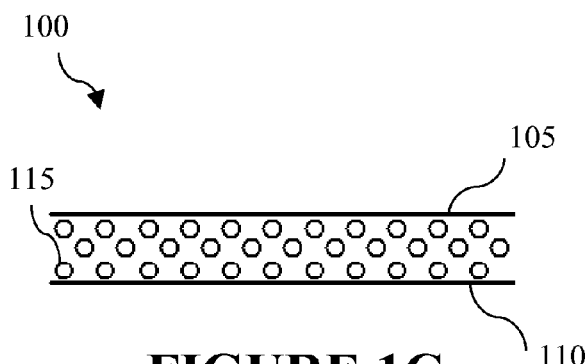
Figure 1G:
Figure 1D:
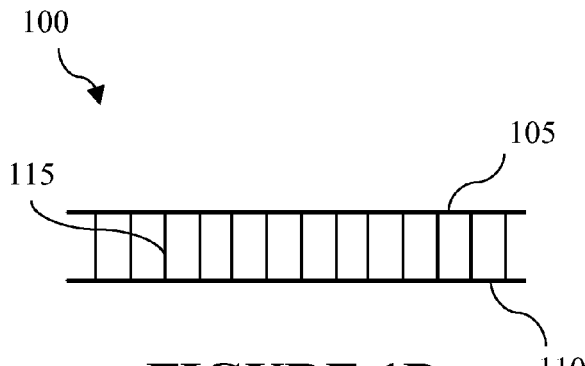
Figure 1H:

In an example illustrated in FIG. 1A, interior layer 115 comprises a plurality of non-complementary contoured layers. When a portion of the mat is compressed, respective portions of the contoured layers also compress (becoming less contoured), as illustrated in FIG. 1E. In an example illustrated in FIG. 1B, interior layer 115 comprises a plurality of loosely packed balls of material. When a portion of the mat is compressed, the balls within the portion also compress, as illustrated in FIG. 1F. In an example illustrated in FIG. 1C, interior layer 115 comprises a plurality of granules and/or molecules. When a portion of the mat is compressed, the granules and/or molecules within the portion may condense within a bottom region of the portion and/or migrate to neighboring portions of the mat, as illustrated in FIG. 1G. In an example illustrated in FIG. 1D, interior layer 115 comprises a plurality of supports. The supports may comprise, e.g., sheets or rods. The supports may be compressible, e.g., due to use of a weak material, a deformable material, a malleable material, etc. and/or due to a dimension. For example, the supports may be thin and thus weak. When a portion of the mat is compressed, supports within the compressed portion may deform, break and/or at least partly collapse, as illustrated in FIG. 1H.

In some embodiments, the mat is compressible because one or more materials of the mat are compressible. In some embodiments, interior layer 115 comprises or consists of one or more non-solid, semi-solid and/or viscous materials. Interior layer 115 may comprise and/or consist of a moldable substance, such as a substance as disclosed in U.S. application Ser. No. 12/413,509, which is hereby incorporated by reference in its entirety. In some embodiments, interior layer 115 comprises or consists of one or more materials having a viscosity of at least about, about or less than about 0.01, 0.1, 1, 2, 3, 5, 10, 50, 100, 200, 250, 300, 500, 750, 1,000 or 10,000 Pa·s. In some embodiments, interior layer 115 comprises or consists of one or more materials having a viscosity of about 1-400 Pa·s or about 10-300 Pa·s. Interior layer 115 may include a gas (e.g., air). In some embodiments, at least 50%, 70%, 90%, 95% or 99% of a total volume of interior layer 115 or all of interior layer 115 is air. For example, top layer 105 may be supported over bottom layer 110 with sidewalls (and, in some instances, one or more internal supports, such as thin rods, walls, contoured layers, loosely packed balls, etc.), such that interior layer 115 is primarily composed of air.

Though embodiments described herein may refer to mats include one, two, three or more layers, it is understand that some embodiments includes mats with other numbers of layers. For example, in one embodiment, a mat such as one illustrated in FIG. 1A, 1B, 1C or 1D may include a top layer that is deformable (e.g., an aluminum-containing top layer 105) and a top-most layer positioned above or on top layer 105 that comprises, e.g., a thin layer of silicone. Thus, reference to "top layer" or "bottom layer" may or may not indicate that the respective layer is the top-most layer or the bottom-most layer in a mat.

The mat may include, e.g., a metal (e.g., aluminum, iron, steel, etc.), silicon, silicone, clay-like substance, a moldable substance, sand or Teflon™. In some instances, the mat and/or one, more or all of the materials of the mat can withstand heat of up to 200, 400, 600, or 800 degrees Fahrenheit. The mat may comprise food-safe materials. For example, a top or top-most surface of the mat may be food safe and/or all materials of the mat may be food safe. The mat may include a non-stick, tacky, semi-adhesive, adhesive, rough and/or relatively high surface-area top and/or bottom surface. For example, the mat may include a top-most surface comprising silicon, silicone and/or Teflon™ to allow for a smooth appearance, easy cleaning, and/or, e.g., increased friction between the mat and an above-positioned surface. The mat may include a top-most surface with a relatively rough surface (e.g., to enhance friction or contact with an object positioned on the mat).

In some embodiments, a top and/or bottom surface of the mat is of a different composition than one or more other portions of the mat. For example, the mat may include a bottom adhesive layer and other non-adhesive layers. As another example, the mat may include a top layer and/or bottom layer that is substantially solid and substantially non-compressible, and an interior compressible layer. In some embodiments, part or all of the mat (e.g., a top layer and/or interior layer but potentially not the bottom layer) may be deformable and/or substantially non-resilient. For example, a mat may allow a user to indent a portion of the mat, and the mat may thereafter substantially or completely retain the indented shape (e.g., permanently or until the mat is reshaped).

In one embodiment, top layer 105 comprises a metal (e.g., aluminum) and has a thickness of about 0.001-1 cm. In one embodiment, bottom layer 110 comprises a friction-enhancing surface, comprises silicon and has a thickness of about 0.01-1 cm. In one embodiment, interior layer 115 comprises at least about 70% air, has a thickness of about 0.5-5 cm and further includes a plurality of support structures configured to support top layer 105 over bottom 110 but also configured to substantially collapse upon exertion of downwards force on the support. It will be appreciated that, as used herein, compression in response to a downwards force refers to compression in response to a reasonable amount of downwards force, such as a force that could be comfortably exerted by an average baker with his hands.

The mat may allow for easy separation of a food item placed on the mat from the mat. For example, in one embodiment, the mat comprises a non-stick material, a non-stick top-most surface and/or a top-most surface that may be greased (e.g., using cooking spray). Thus, the mat may be configured such that, e.g., after cake batter is poured on the mat, and the mat and batter are baked, the mat can be easily separated from the cake.

The disclosure herein, on occasion, refers to a batter or a cake batter. It will be understood that other embodiments relate to other types of food items. For example, in some embodiments, a batter is replaced with a soft or liquid food item (e.g., melted chocolate, softened ice cream, a pudding mixture, etc.), and the item may be cooled or frozen rather than being baked. Further, the disclosure herein, on occasion, refers to baking a system and/or food item. It will be understood that other embodiments relate to other processes (e.g., food-item state-transforming processes), such as heating, cooling, freezing, etc.

Figure 2:
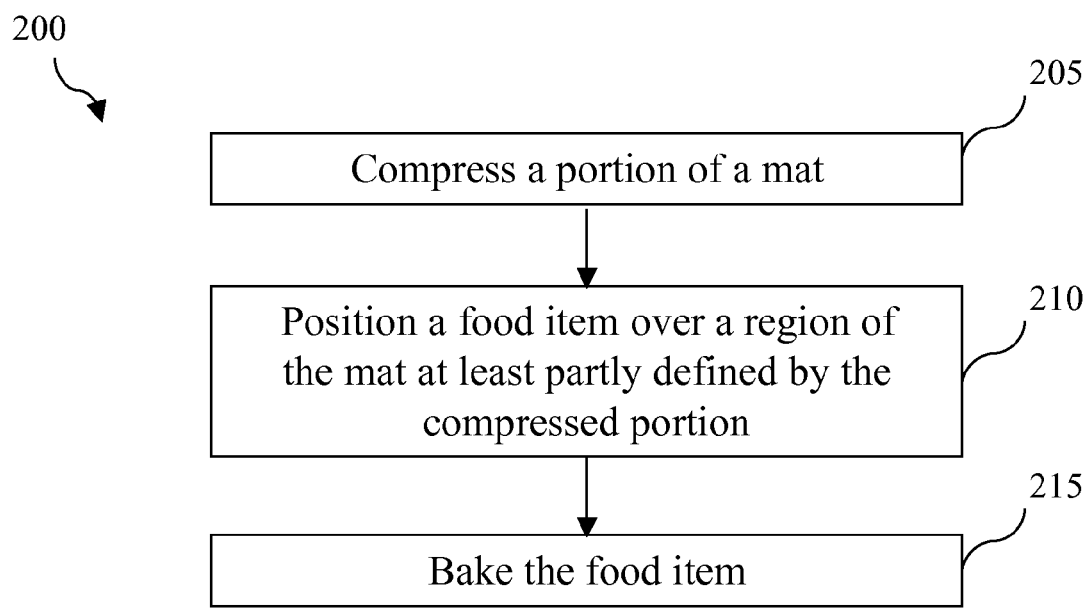
FIG. 2 illustrates an example of a method for making food items, according to some embodiments of the invention.

FIG. 2 illustrates an example of a method 200 for making food items. At 205, a portion of a mat (e.g., a compressible or deformable mat) is compressed. Various embodiments disclosed herein refer to a compressible mat or a compressible portion of a mat or compression of a mat or portion. It is understood that some embodiments instead relate to a deformable mat or portion, shapeable mat or portion, etc.

The mat may include any mat as described herein. The compressed portion may comprise a perimeter of a shape (which may be different from a perimeter of the mat or an underlying surface, such as a cake pan or cookie sheet). For example, a cake-shaping object may be positioned on or above the mat and pressed downwards into the mat. The compressed portion may further comprise an area, such as an area corresponding to a shape desired for a food item (e.g., a desired cake shape). In one instance, a user may press an area of the mat down (using his hand(s), a cake stencil, rolling pin, etc.). The area may or may not have been defined by a perimeter (e.g., formed by a cake-shaping object). The compressed portion may or may not be substantially flat.

A depth of the compressed portion of the mat may be, on average, at least about, about, or less than about 0.01, 0.1, 0.25, 0.5, 0.75, 1, 2, 3 or 6 inches less than a depth of a non-compressed portion of the mat. The compressed portion may have a depth that is, on average, at least about, about or less than about 1%, 5%, 10%, 20%, 40%, 60%, 80% or 90% of an average depth of a non-compressed portion of the mat. In some embodiments, a depth of the compressed portion is about 0.1-0.5 or 2-6 inches less than a depth of a non-compressed portion of the mat and/or less than about 40% of a depth of the non-compressed portion.

At 210, a food item is positioned (e.g., poured, spread, placed, etc.) over or into a region of the mat at least partly defined by the compressed portion. For example, the region may include a compressed area or an area inside a compressed perimeter. The region may include and/or consist of the entire compressed portion. The region may include other portions in addition to the compressed portion. For example, in one embodiment, a mat is placed into a rigid container and a region is compressed, such that the compressed region has a depth that is, e.g., 1 inch less than a depth of an uncompressed region of the mater. A batter is poured into the compressed region, but enough batter is added to over-fill the compressed region. The extra batter may flow towards the edges of the rigid container. Thus, for example, a user may create a tiered cake or a cake with a standard-size bottom layer (e.g., a square) and a custom-shaped top layer (e.g., a heart) attached to the bottom layer.

The food item may include a liquid, non-solid or semi-solid food item. The food item may include a batter, such as cake batter. The food item may be one that will transform into a final food item after a cooking process (e.g., baking, heating, cooling, freezing, or letting stand for a time period). The transformation may include a state change (e.g., transforming a liquid, non-solid or semi-solid food item into a solid food item, transforming a liquid food item into a semi-solid food item, etc.). For example, the initial food item may comprise a dough, batter, mixture, or melted substance that may be transformed into a cake, cookie, pie, gelatin dessert or frozen dessert subsequent to baking or freezing.

A top surface of the positioned food item may or may not extend above a top surface of a non-compressed portion of the mat. For example, in one embodiment, a thick mat is provided. A portion of the mat may be compressed to form an indented area about 2-6 or about 3-4 inches deep. Cake batter may be poured into the compressed portion, wherein a top surface of the batter does not rise above a top surface of a non-compressed portion of the mat adjacent to the compressed portion. As another example, in one embodiment, a cake-shaping object (e.g. a strip) is formed into a shape and positioned over a mat. A portion of the mat within the object-defined shape or corresponding to a perimeter of the shape may be compressed. Cake batter may be poured into the compressed portion, wherein a top surface of the batter rises above a top surface of a non-compressed portion of the mat adjacent to the compressed portion, as the object keeps the batter contained within the area. As another example, a portion of the mat is compressed to form an indented volume about 0.25-3 inches or about 0.5-1 inch deep. Cake batter may be poured into the compressed portion, wherein a top surface of the batter rises above a top surface of a non-compressed portion of the mat adjacent to the compressed portion. A tiered cake may then be formed, with an upper level having a custom shape and being smaller than a bottom level of the cake.

At 215, the food item (e.g., and the mat and/or object) is baked. The food item may be baked at any suitable temperature for any appropriate period of time. Temperatures and durations may be chosen based upon, for example, those required for the food item to change states and/or transform into a final desired food item. For example, if the food item comprises a cake batter, temperatures and durations may include those suitable for the cake batter to be transformed into a cake. In some embodiments, the food item is baked for at least about, about or less than about 5, 10, 20, 40, 60 or 120 minutes at a temperature of greater than about, about or less than about 100, 200, 300, 400, 500 or 600 degrees Fahrenheit. In one embodiment, the food item is baked for about 10-40 minutes at a temperature of about 200-500 degrees Fahrenheit. In some embodiments, the food item is heated, cooled or frozen rather than being baked. After 215, the food item may be separated from the mat and/or a food object. The resulting food item may have a shape corresponding to the compressed portion of the mat. For example, a shape of a cake may be substantially similar to a compressed portion of a mat or a region defined by a compressed portion of a mat.

Figure 3:
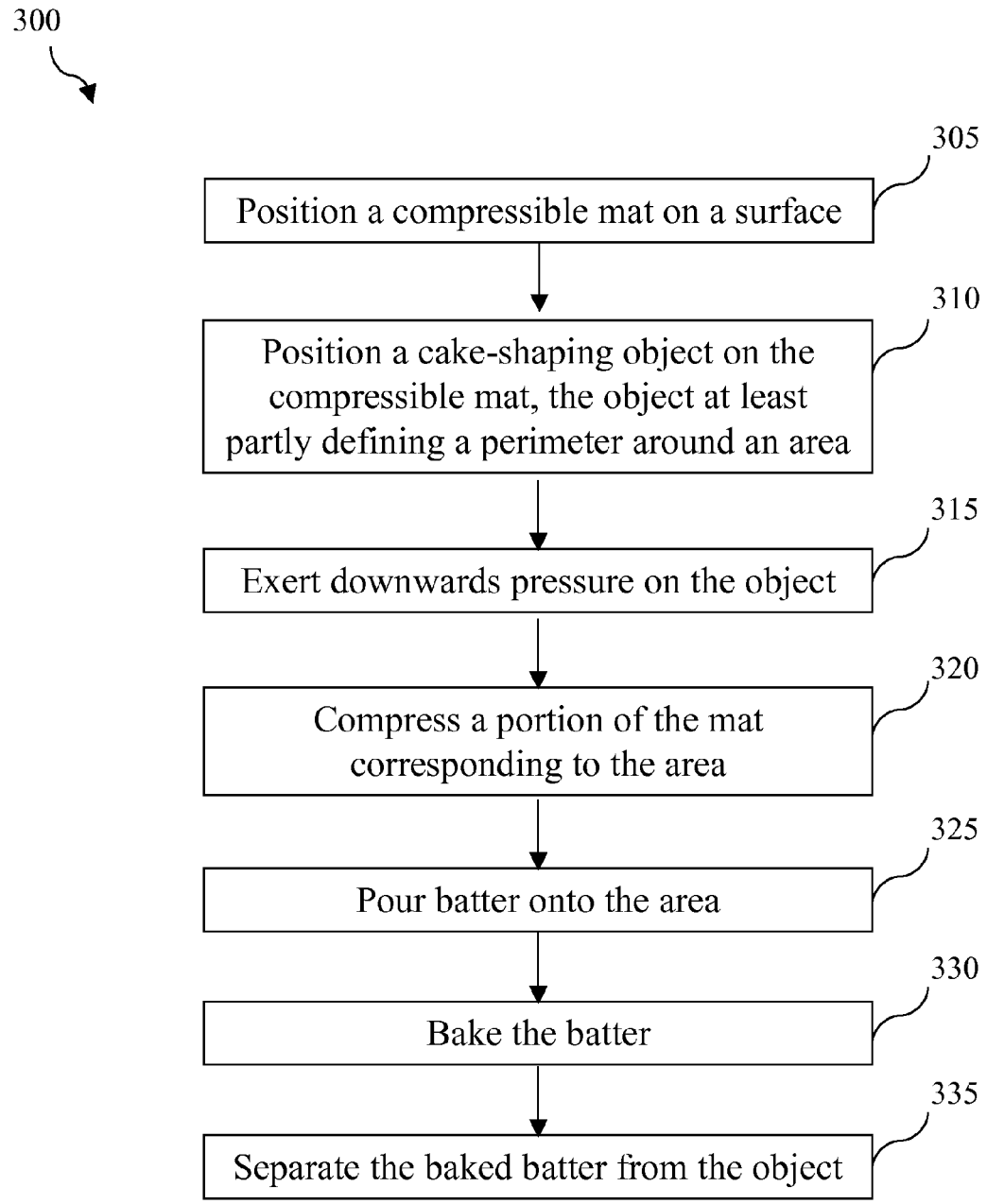
FIG. 3 illustrates an example of a method for baking a cake, according to some embodiments of the invention.
Figure 4A:
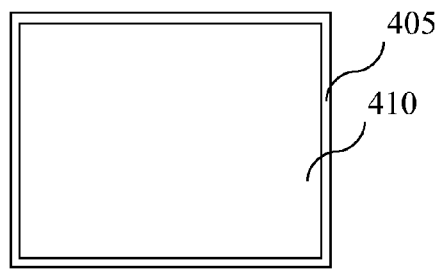
FIGS. 4A-4J illustrate top-down and cross-sectional example visualizations, illustrating how a mat and cake-shaping object may be used to make a food item.
Figure 4B:
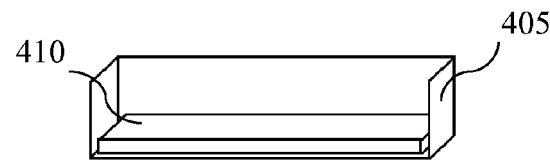

FIG. 3 illustrates an example of a method 300 for baking a cake. At 305, a mat (e.g., a compressible mat) is positioned on a surface. The mat may include any mat as described herein. The surface may include, e.g., a metal, glass, silicon or plastic surface and/or a surface configured to withstand temperatures of at least about 500 or 800 degrees Fahrenheit. The surface may be substantially or completely solid or not (e.g., instead being a mesh or grid surface). In some instances, the surface comprises a surface of a cookie sheet or cake pan. The surface may or may not be flat (with no contours and/or grooves or indentations). In some embodiments, the mat is approximately the same size as or slightly smaller than the surface. FIG. 4A illustrates a top-down view of an example of a mat 310 positioned on a surface of a cake pan 305. FIG. 4B illustrates a cross-sectional view of an example of a mat positioned on a surface of a cake pan.

At 310, a cake-shaping object is positioned on a mat. The cake-shaping object may at least partly define a perimeter around an area. For example, the cake-shaping object may be positioned along a perimeter or border of an area. The cake-shaping object may be formed or shaped to at least partly define a perimeter (e.g., a closed perimeter) around an area (e.g., to at least partly define a shape for a food item). For example, an object may be bent to form a perimeter and/or multiple cake-shaping objects may be arranged to form a perimeter. The object(s) may be configured into a shape that at least partly defines the perimeter before or after being positioned on the mat.

Figure 4C:
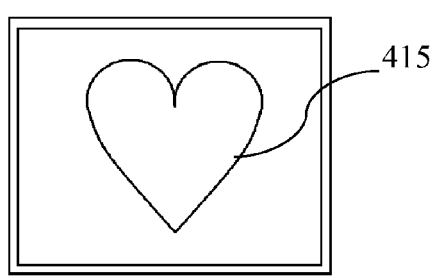
Figure 4D:
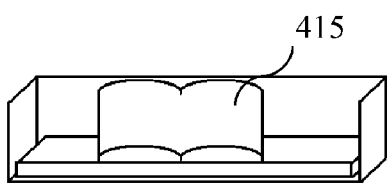

In one embodiment, the cake-shaping object comprises a strip (e.g., having a plurality of vertical supports). In one embodiment, the cake-shaping object comprises a moldable substance. In one embodiment, the cake-shaping object comprises a set of discrete components (e.g., blocks). The cake-shaping object may comprise, e.g., any described herein or any object (e.g., strip or moldable substance) disclosed in U.S. application Ser. No. 12/413,509, which is incorporated by reference in its entirety. FIGS. 4C-4D illustrate an example of a cake-shaping object (which, as depicted, is a strip) 415 formed into a shape of a heart and positioned on the mat.

Figure 4E:
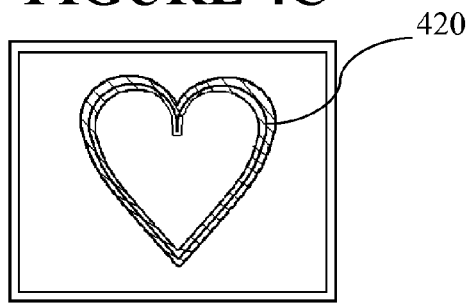
Figure 4F:
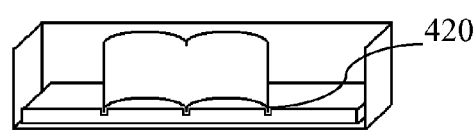

At 315, downwards pressure is exerted on the object. For example, the object may be pressed (e.g., using a user's hands) in a direction towards the mat. The pressure may be sufficient to compress part of the mat underneath the object, to form an indention in a top surface of the mat and/or to form a seal or barrier between the object and the mat. A depth of the indention may be substantially equal to a height of a portion of the object extending below a default surface height of the mat. For example, as illustrated in FIGS. 4D and 4F, after downwards pressure is exerted on object 415, the object moves downwards, towards the bottom of mat 410 and pan 405. In the depicted embodiment, due to the mat's compressibility, only a small region of the mat (the region directly surrounding the depressed strip) is depressed. Thus, a bottom portion of the object is pressed into the mat (and is below a top surface level of the mat), and a complementary shaped indention is formed in the mat. The depth of the object-depression and/or of the mat indention may be, e.g., at least about, about or less than about 0.1, 0.25, 0.5, 1, 3, 5, or 10 inches. In some instances, the depth is about 0.1-1 inch. Side edges of an indention may contact a portion of the object causing the indention or they may not (e.g., resulting in a separation). The separation may be, on average, at least about, about or less than about 0.001, 0.01, 0.1, 0.25, 0.5, 0.75 or 1 inch. In one embodiment, the average separation is less than about 0.5 or 0.1 inches. The mat and/or object may be configured to localize compression. This may prevent, e.g., inadvertent compression of an undesirably large portion of the mat. In some embodiments, a composition and/or packing density within an interior layer of the mat improves compression localization. In some embodiments, one or more deformable, compressible, stretchable and/or non-resilient top layers improve compression localization.

In some embodiments, the pressure is exerted around substantially the entire perimeter. FIGS. 4E and 4F illustrate an example of a cake-shaping object 415 and mat 410 after pressure was exerted on the object. As illustrated, the pressure resulted in an indention 420 in the mat in a region surrounding the object. As illustrated in FIG. 4F, the downwards pressure also resulted in object 415 being closer to a bottom surface of pan 405 as compared to the object before application of the pressure. In some other embodiments, a cake-shaping object does not define an entire perimeter. For example, a shape may be partly formed using a sidewall in a container (e.g., a bottom sidewall of a cake pan may be used to form a bottom of a perimeter of a "1" and a strip may extend from the wall to form the rest of the shape).

Figure 4G:
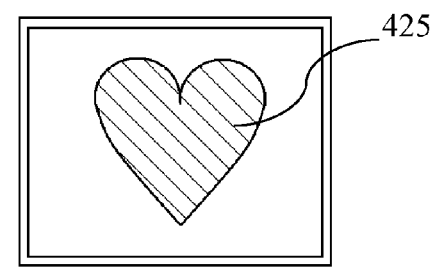
Figure 4H:
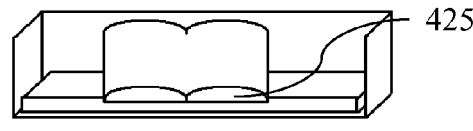

At 320, a portion of the mat corresponding to the area is compressed. For example, a cake-shaping strip may be formed into a closed shape. The portion of the mat within the closed shape may then be compressed. The mat may be compressed, e.g., at least about, about or less than about 0.1, 0.25, 0.5, 1, 3, 5, or 10 inches. In some instances, the mat is compressed about 0.1-1 inch. In some instances, the compressed area has an average thickness that is less than about 80%, 60%, 40%, 20%, 10%, 5%, 3% or 1% of an average thickness of the uncompressed mat or adjacent uncompressed areas of the mat. The mat may be compressed, e.g., by a user pressing down in the portion of the mat (using his hand(s), a cake stencil, rolling pin, etc.). The compression may or may not result in a compressed area with a substantially flat surface. FIGS. 4G and 4H illustrate a compressed region 425 (e.g., that may have been formed by a user) inside object 415. In some instances, block 330 is omitted from process 300.

At 325, batter may be poured onto the area. In one instance, the cake-shaping object and the mat are greased (e.g., using cooking spray) prior to pouring the batter onto the area. In one instance, the cake-shaping object and/or mat are coated (e.g., by spreading a liquid or paste or spraying an aerosol) with a coloring or flavoring substance. For example, the object and/or mat may be coated with a gel-like food dye. The flavor and/or color may be at least partially transferred to a surface of a food item positioned adjacent to the object and/or mat.

Figure 4I:
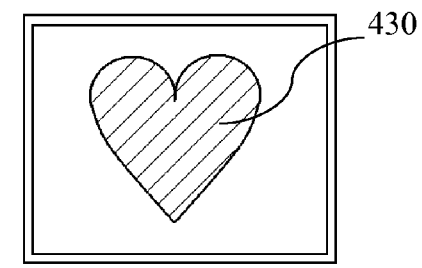
Figure 4J:
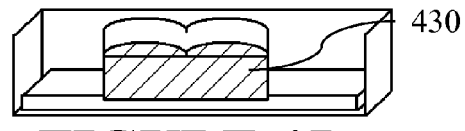

The batter may include a cake batter. The batter may, subsequently and during baking, rise up along a side surface of the cake-shaping object. The cake-shaping object, and/or sidewalls of the compressed area in the mat may keep all or part the batter confined to the area. FIGS. 4I and 4J illustrate an example of batter 430 poured onto compressed area 425. The compression of the mat may decrease the possibility of batter leaking under cake-shaping object 415.

At 330, the batter may be baked. The batter may, for example, be baked at a temperature and for a duration appropriate to transform the batter into a baked product (e.g., into a cake). In some embodiments, the food item is baked for at least about, about or less than about 5, 10, 20, 40, 60 or 120 minutes at a temperature of less than about, about or greater than about 100, 200, 300, 400, 500 or 600 degrees Fahrenheit. In one embodiment, the food item is baked for about 10-40 minutes at a temperature of about 200-500 degrees Fahrenheit.

At 335, the baked batter may be separated from the object. In some embodiments, the baked batter is not at all or is not substantially attached to the batter. For example, cooking spray or a coating on the object may have prevented the baked batter from adhering to the object. In some embodiments, the baked batter is at least partly adhered to the object. Any adhered side surface of the baked batter may be separated from the object, e.g., by gently pulling on the baked batter or inserting an object (e.g., a knife) between the baked batter and the object to force the separation. The object may be further or alternatively separated from the baked batter, e.g., by lifting the object upwards from the mat. In some embodiments, the object may be moved horizontally away from the baked batter. This may or may not require compressing additional portions of the mat (e.g., compressing all of the mat). In one embodiment, the baked batter is inverted onto another pan. The mat may, e.g., stay in an initial pan. A cake-shaping object may also stay in the initial pan or it may be removed after the inversion.

The baked batter may have a shape substantially similar to a shape of the area. Thus, for example, in FIG. 4, a resulting cake may have a heart shape substantially similar to the shape formed by object 415. In some embodiments, a top surface of the baked batter is contoured. For example, sufficient batter may have been poured at 325 to overflow the area. The baked batter may then having a tiered appearance, with a bottom layer having, e.g., a shape of a cake pan having the surface that the mat is on, and a top layer having a shape of the area.

As another example, the compression at 320 may not have resulted in a flat compressed surface. This may result in a baked batter having a top surface corresponding to contours present in the compressed surface.

Figure 5:
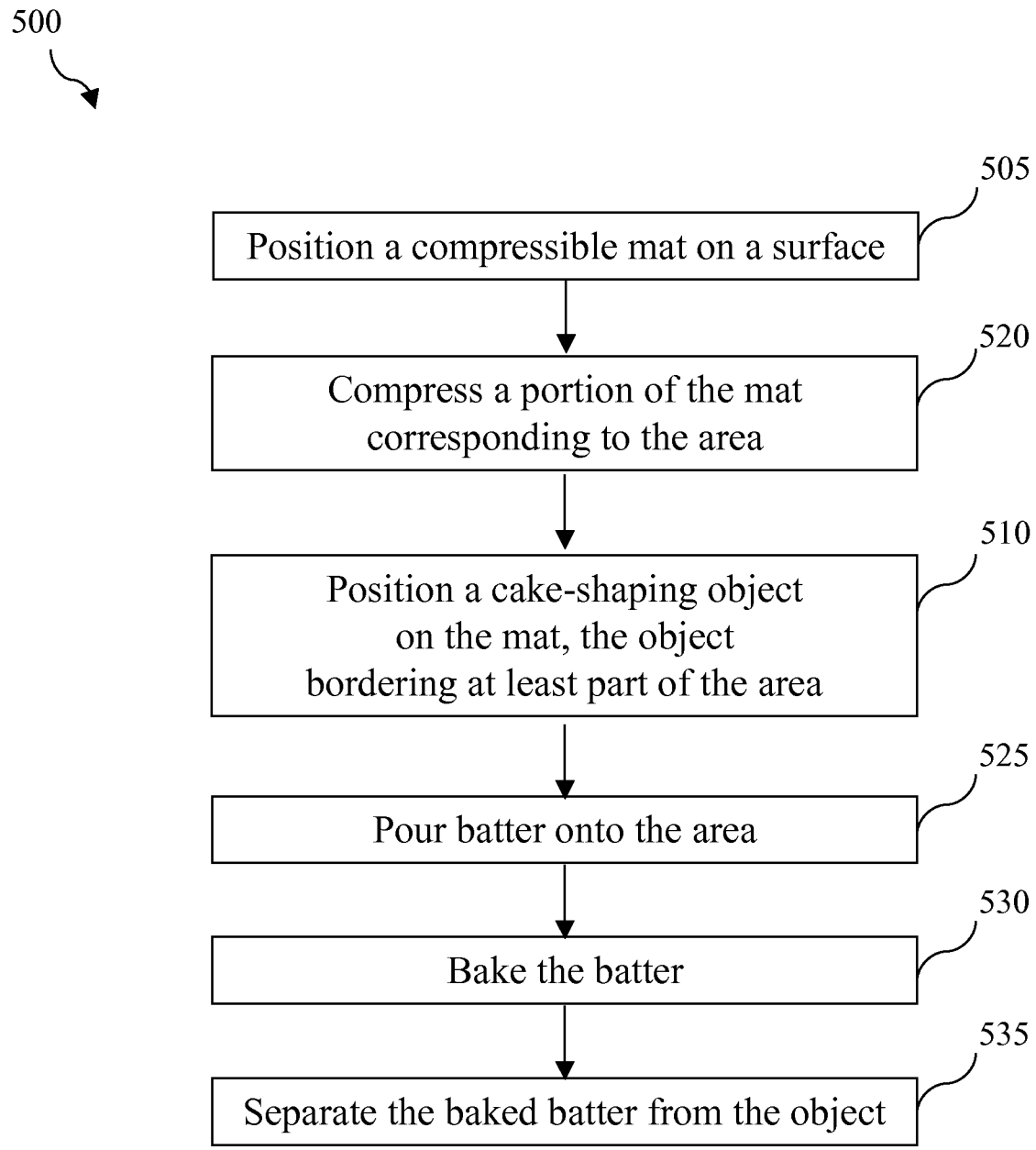
FIG. 5 illustrates an example of a method for baking a cake, according to some embodiments of the invention.

FIG. 5 illustrates an example of another method 500 for baking a cake. Method 500 is similar to method 300. However, in method 500, a region of the mat is compressed prior to positioning a cake-shaping object on the mat and/or substantially no downwards pressure is exerted on the object. After an area is compressed, the cake-shaping object may be positioned on the mat (e.g., along an outer edge of the compressed area or along an edge just outside of the area). As illustrated, method 500 does not include exerting downwards pressure on the cake-shaping object, though in some embodiments, such pressure could be exerted.

Figure 6:
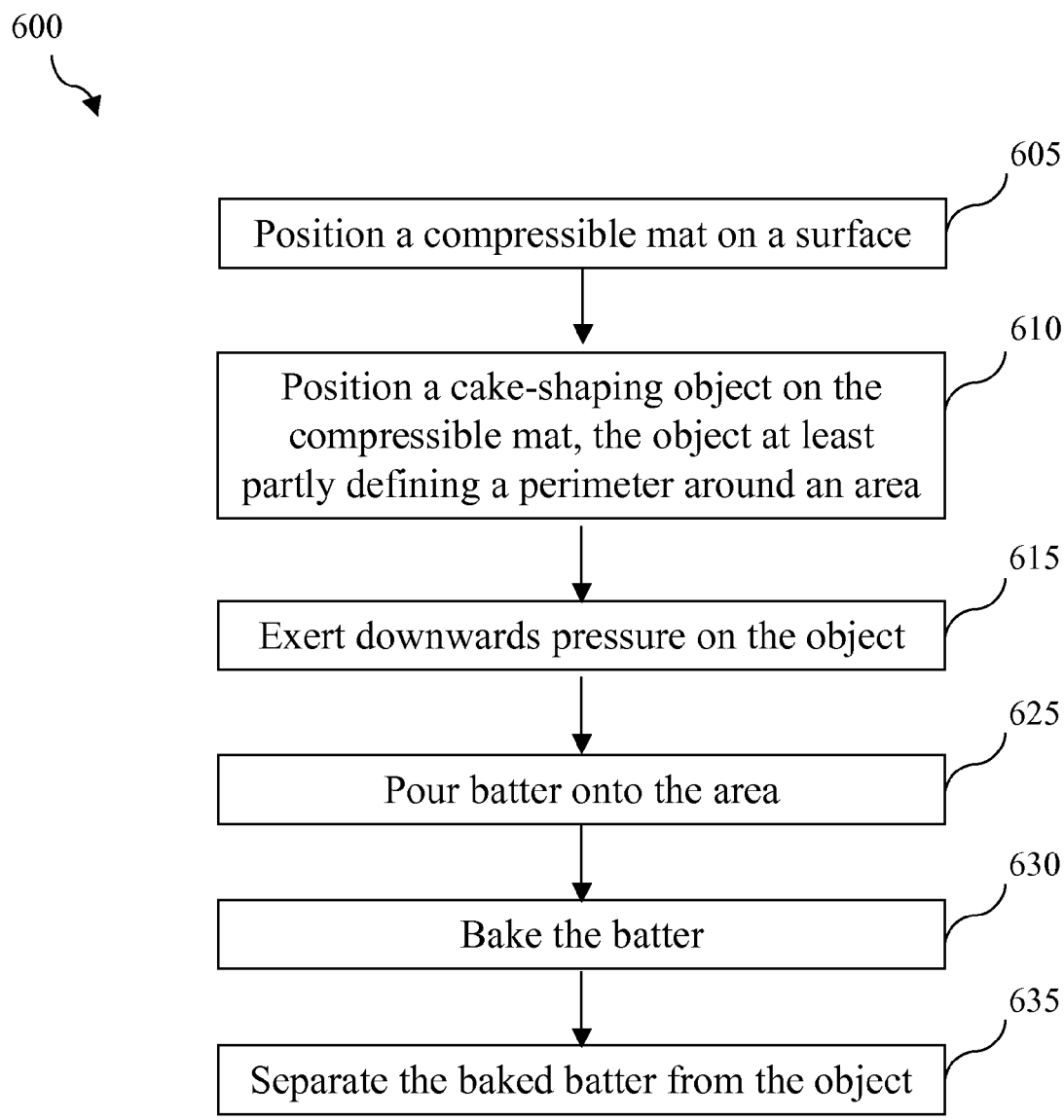
FIG. 6 illustrates an example of a method for baking a cake, according to some embodiments of the invention
Figure 7A:
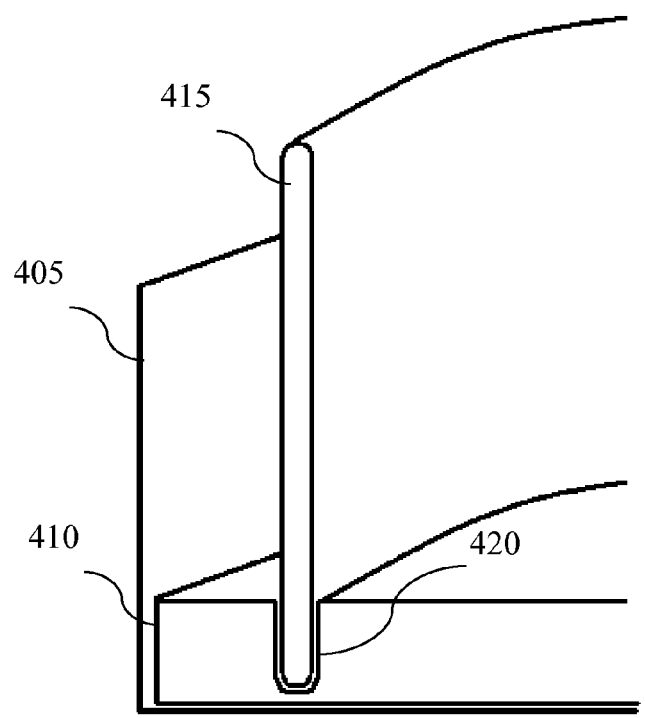
FIGS. 7A-7C illustrate an interface between a mat and a shaping object, according to some embodiments of the invention.
Figure 7B:
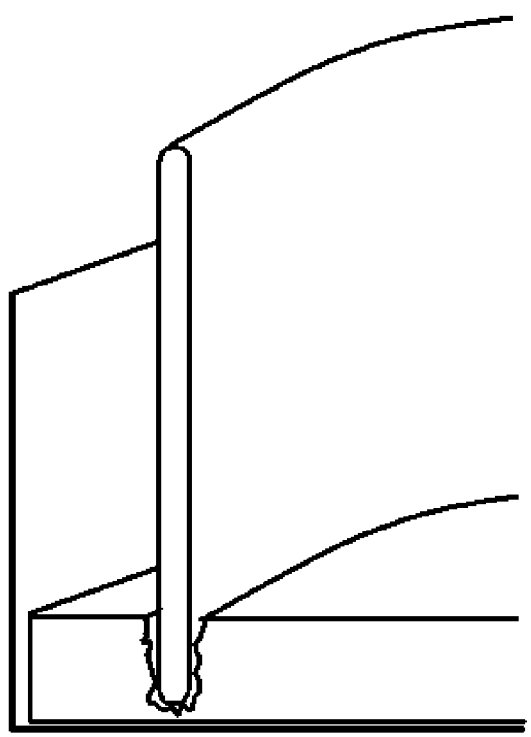
Figure 7C:
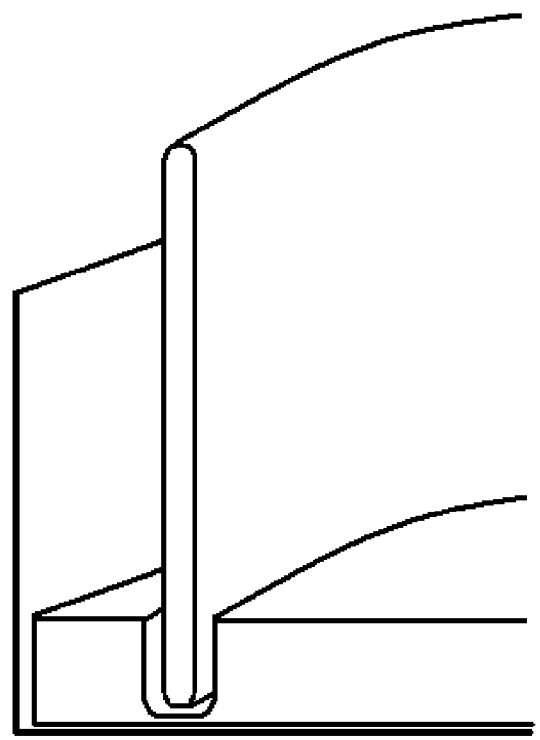

FIG. 6 illustrates an example of another method 600 for baking a cake. Method 600 is similar to method 300. However, in method 600, the region of the mat is not compressed. Thus, a bottom surface of the poured batter may be at approximately a same height as a top surface of the mat outside of the object. FIGS. 7A-7C illustrate how the mat may continue to deter or prevent batter from leaking through the object. In these instances, a crevice (i.e., indentation) is formed in the mat. A width of the crevice can be slightly larger than a width of object 415. For example, the width of the indentation may be at least as wide as a width of object 415 and also less than 5 cm, 3 cm, 2 cm, 1 cm, 5 mm, 3 mm, 2 mm or 1 mm wider than the width of object 415. As another example, the width of the indentation may be at least as wide as a width of object 415 and also less than 150%, 125%, 110%, 105% or 101% the width of object 415.

In FIG. 7A, there is very little space between the mat sidewalls of indention 420 and the edges of object 415. Thus, batter may be prevented from leaking to the other side of object 415. FIG. 7B illustrates an example in which mat 410 does not form as tight of a seal around depressed object 415. However, in this embodiment, the distance between the sidewalls of indention 420 and object 415 is variable. The occasional closeness or contact between object 415 and sidewalls of indention 420 (e.g., at a bottom of the indention and/or at one or more side-wall locations) may be sufficient to deter or prevent leaking FIG. 7C illustrates an example in which neither a tight seal nor direct contact is formed between object 415 and mat 410. However, leaking of batter may nonetheless be deterred or prevented due to indentation 420. For example, in the depicted example, in order for batter to leak through object 415, it would need to flow around the bottom of the object, which would require that it flow upwards to reach the outer mat surface. The batter may not be under sufficient pressure to travel upwards in this manner.

In some embodiments, such as those illustrated in FIGS. 4 and 7, mat 410 remains substantially flat while, e.g., a cake-shaping object is formed into a shape, and a food item to be baked is positioned over the mat and inside the object. In some embodiments, a mat is does not remain flat. For example, all or part of a mat outside a defined area may be pressed, crumpled, collapsed, etc. inwards towards the object and/or folded upwards and/or wrapped around the object, to inhibit a food item from leaking under the object.

Figure 8A:
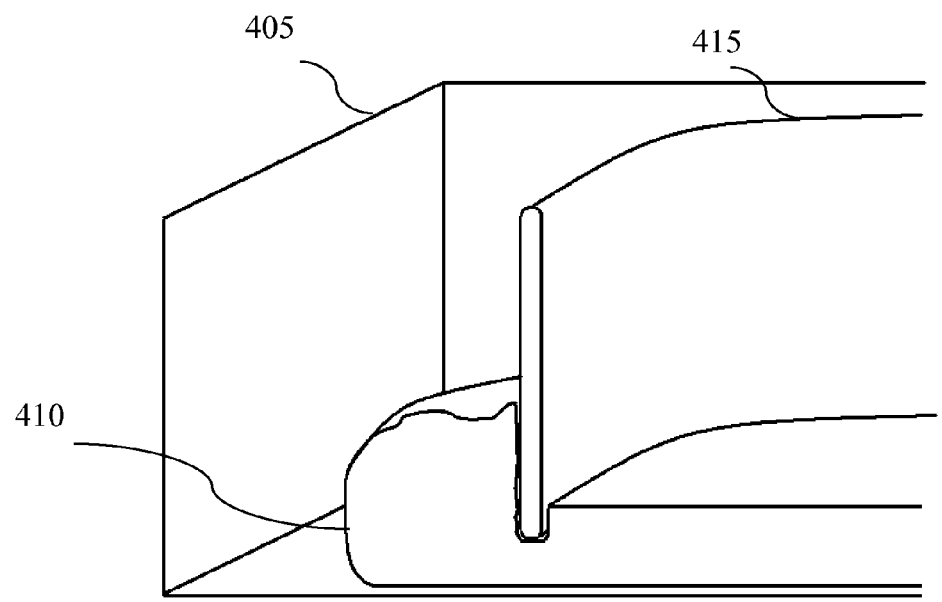
FIGS. 8A-8B illustrate examples of a system including a mat and a shaping object, according to some embodiments of the invention.

For example, FIG. 8A illustrates an example in which a part of mat 410 that is outside an area defined by object 415 is compressed inwards towards an outer surface of object 415. In some embodiments, this compression includes reshaping mat 410. For example, a deformable mat may be crumpled inwards towards object 415. Leakage of food items may be inhibited because: (1) the compression decreases space between an outer surface of object 415 and an adjacent surface of mat 410 (e.g., the space between an outer surface of object 415 and an adjacent mat surface illustrated in FIG. 7C is eliminated in the embodiment illustrated in FIG. 8A), which may result in increased contact and blocking a food item's path; (2) there is an increased surface area at an interface of an outer surface of object 415 and mat 410 (e.g., mat 410 extends up higher along an outer edge of object 415 in FIG. 8A as compared to FIG. 7C), which may length, block, or narrow a path that a food item would need to travel in order to leak beyond the interface; and/or (3) other reasons.

Figure 8B:
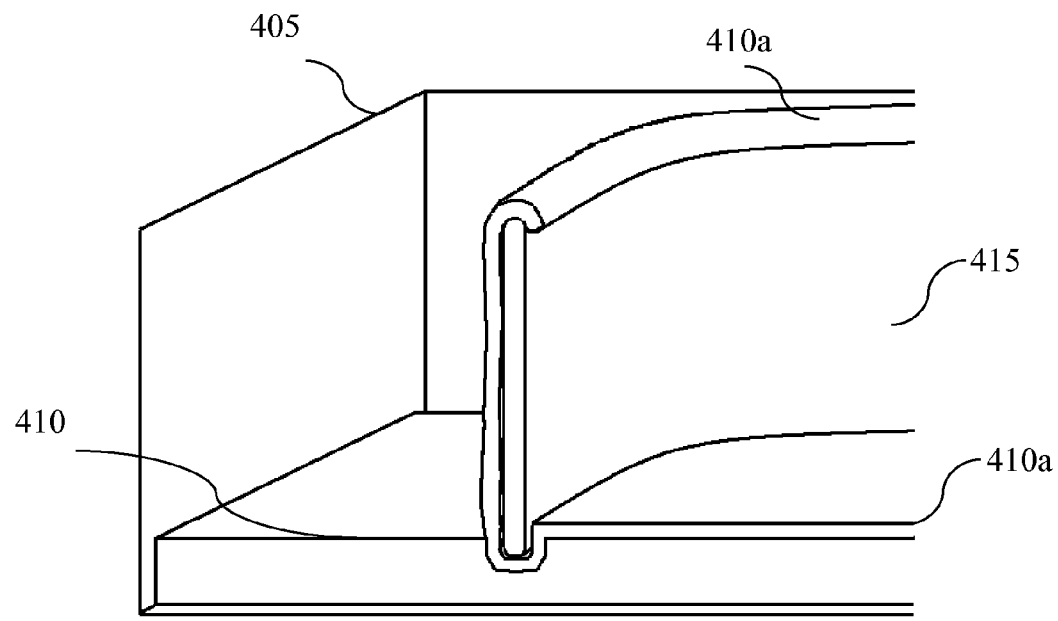

FIG. 8B illustrates an example in which one or more top layers 410a of mat 410 is folded upwards onto object 415 and wrapped around object 415. In one instance, top layer(s) 410a are coupled to bottom layer(s) of mat 410 using, e.g., a weak adhesive. A user may thus separate top layer(s) 410a by applying upwards force on an edge of the layer. In another instance, top layer(s) 410a are attached (e.g., only attached) to bottom layer(s) of mat 410 along one or more outer attachment regions. For example, mat 410 may have an upper tab extending around part or all of a perimeter of the mat. The tab may include top layer(s) 410a and one or more bottom layers of the mat. For example, a top subset of bottom layers of mat 410 may have a slightly larger surface area than a bottom subset, or a top portion of a bottom layer of mat 410a may have a slightly larger surface area than a bottom portion. A user may then cut or tear away the tab in order to release top layer 410a from the bottom layer(s) of the mat. As another example, top layer(s) 410a may be attached to bottom layer(s) of the mat only along the perimeter, and a user may then cut or tear away the perimeter (e.g., cutting or tearing through an entire thickness of the mat) to release top layer 410a.

Top layer 410a may or may not comprise features described with respect to top layer 105 or a top-most layer. Top layer 410a may, e.g., be deformable or malleable. Top layer 410a may include, e.g., a metal (e.g., aluminum), a silicon, a silicone, etc. Top layer 410a may or may not be tacky and/or comprise an adhesive (e.g., a weak adhesive). Top layer 410a may or may not be stretchable. Top layer 410a may have a thickness (i.e., depth) of at least about, about or less than about 0.001, 0.01, 0.1, 0.5, 1, 2, 3 or 5 cm. In one embodiment, top layer 105 has a thickness of less than 1 cm.

Leakage of food items may be inhibited because: (1) the folding of top layer(s) 410 decreases space between an outer surface of object 415 and an adjacent surface of mat 410 (e.g., the space between an outer surface of object 415 and an adjacent mat surface illustrated in FIG. 7C is eliminated in the embodiment illustrated in FIG. 8B), which may result in increased ontact and blocking a food item's path; (2) there is an increased surface area at an interface of an outer surface of object 415 and mat 410 (e.g., mat 410 extends up higher along an outer edge of object 415 in FIG. 8B as compared to FIG. 7C), which may lengthen, block, or narrow a path that a food item would need to travel in order to leak beyond the interface; and/or (3) other reasons.

Many variations to embodiments illustrated in FIGS. 8A-8B are possible. For example, the embodiment illustrated in FIG. 8A may be modified such that only one or more top layers 410a of mat 410 is compressed inwards. Conversely, the embodiment illustrated in FIG. 8B may be modified such that the entire mat 410 is folded onto object 415. The embodiment illustrated in FIG. 8B may be modified such that layer 410a does not wrap around object 415. For example, layer 410a may be sufficiently rigid such that it can be folded towards or at a vertical position and substantially maintain its position while a food item is added inside a defined shape and baked. As another example, top layer 410a and/or object 415 may be configured such layer 410a may be pressed into object 415 (e.g., layer 410a and an outer surface of object 415 may both comprise aluminum foil, such that they may be compressed and/or pinched together).

Figure 9:
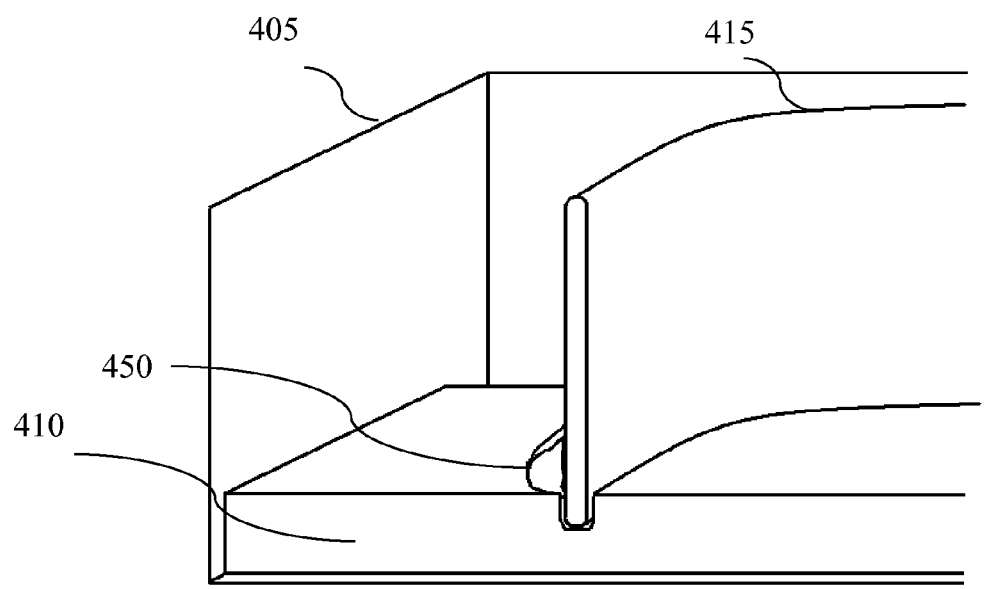
FIG. 9 illustrates an example of a shaping object and a leak-inhibiting object, according to some embodiments of the invention.

FIG. 9 illustrates an embodiment of a system including a mat-independent leak-inhibiting component 450. Component 450 may or may not be provided and/or used with mat 410 and/or object 415. Component 450 may be positioned at or near a bottom of object 415. Component 450 may include, e.g., a compressible or deformable component, such that it may be pressed (e.g., wedged) into a corner formed between object 415 and an adjacent bottom surface (e.g., a top surface of mat 410). For example, component 450 may include a loosely packed ball or roll of aluminum foil that may be compressed and pressed into an interface or space between object 415 and an adjacent bottom surface. Thus, component 450 may prevent a food item positioned inside a shape at least partly defined by object 415 from leaking under object 415. In some embodiments, multiple components 450 are included in a system (e.g., multiple compressible balls may have been pressed by a user into various regions near or at object 415, which may be regions perceived to be most likely to leak or regions adjacent to each other, such that components form a continuous covering at or near all or substantially all of an edge of object 415). In some embodiments, a single component 450 is included in a system (e.g., a long roll or strip of component 450 is positioned near or at all or substantially all of an edge of object 415).

Component 450 may have a low density, which may, e.g., be a result of air space and/or packing (e.g., even of a medium or high density material) within component 450. Component 450 may include, e.g., a metal, silicon, and/or silicone. Component 450 may be food-safe, edible, and/or able to safely withstand heat up to about 500 degrees Fahrenheit.

In some embodiments, component 450 comprises or consists of a sealant (e.g., a food-safe sealant). In some embodiments, component 450 comprises a liquid or semi-solid material that transforms into a solid (e.g., after a period of being exposed to air and/or after being heated). For example, component 450 may include a liquid-solid mixture, which may be squeezed or spread near a base of object 415 as illustrated in FIG. 9. A system including object 415 and component 450 (e.g., and mat 410 and/or pan 405) may be baked before or after food item 420 is added. In one embodiment, component 450 comprises a paste (e.g., a paste including flour and water). In one embodiment, component 450 includes an adhesive, such as a food-safe and/or edible adhesive. In one embodiment, component 450 includes Dow-Corning RTV732.

FIGS. 8A, 8B and 9 illustrate embodiments in which a form of leak protection is provided along an outer surface of object 415. In some embodiments, protection may be alternatively or additionally provided along an inner surface of object 415 (e.g., such that component 450 is positioned along an inner surface of 415).

Figure 10:
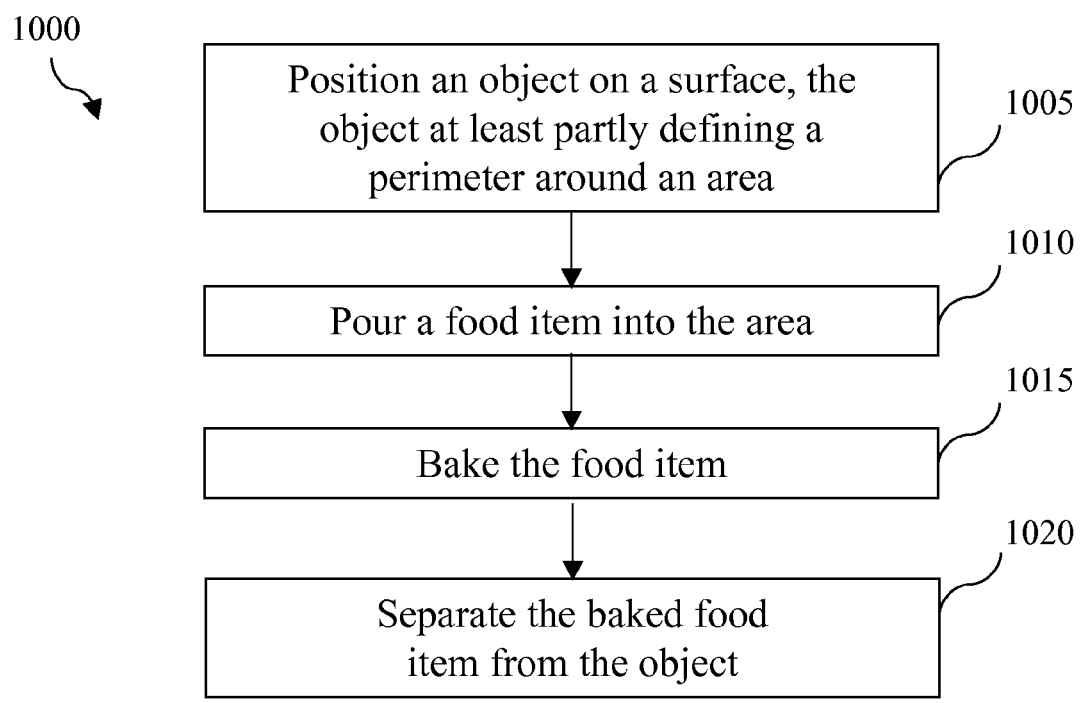
FIG. 10 illustrates an example of a method for baking a food item, according to some embodiments of the invention.

In some embodiments, a system may prevent or inhibit a food item (e.g., cake batter) from leaking through (e.g., under) an object (e.g., a cake-shaping object) without compressing a mat. FIG. 10 illustrates an example of a method 1000 for baking a food item. At 1005, an object may be positioned on a surface. In some instances, the surface comprises a top surface of a mat (e.g., a compressible or non-compressible mat), which may include a mat as described herein. In some instances, the surface comprises a top surface of a cookie sheet, pan (cake pan), tray, etc. The surface may comprise a metal and/or silicon. In some instances, the surface is magnetic and/or tacky. The surface may, e.g., be flat or have contours or grooves/ridges.

The object may include a cake-shaping object, such as a cake-shaping strip, cake-shaping blocks, etc. In some instances, the cake-shaping object includes a bottom portion and a top portion. For example, a bottom portion may be compressible and a top portion may be non-compressible. A bottom portion may include a tacky material or a material configured to adhere to another surface, while a top portion does not. A bottom portion may include one or more magnets, while a top portion does not. The bottom portion and/or top portion may have a height (e.g., a non-compressed height) of more than about, about, or less than about 0.001, 0.01, 0.1, 0.25, 0.5, 0.75, 1, 2, 3, 5 or 10 inches. In some instances, the bottom portion has a height of less than about 1 inch and a top portion has a height of greater than about 2 inches. The bottom portion may include a different material composition than the top portion. One or both of the top and bottom portions can include features of strips disclosed elsewhere herein (e.g., including a set of vertical supports). The bottom and top portion can be contiguous or separated by other intermediate portions. In some instances, the bottom portion has substantially the same composition but has an additional component (e.g., an internal or external magnet or adhesive). In some instances, the object does not include different top and bottom portions. Though not shown, in some instances, downward pressure may be exerted on the object (e.g., to ensure solid contact between the object and the surface or to cause the object to create a seal with the surface).

At 1010, a food item may be poured into the area. At 1015, the food item may be baked. At 1020, the baked food item may be separated from the object. 1010-1020 may include features of similar steps described elsewhere herein. For example, 1010 may include pouring cake batter into the area, the cake batter being partly or fully contained (e.g., within the area) by a cake-shaping strip object.

Figure 11A:
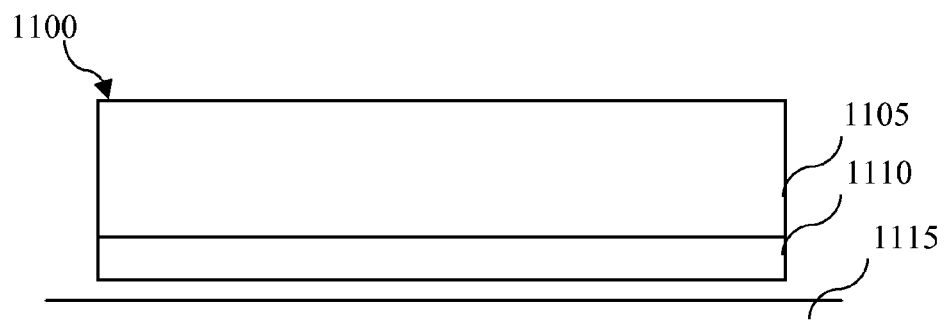
FIGS. 11A-11B illustrate an example section of multi-portion object, according to some embodiments of the invention.
Figure 11B:

FIGS. 11A-11B illustrate an example section of multi-portion object 1100 (e.g., cake-shaping object). As illustrated, the object comprises a strip, though the concept could be extended to other objects or cake-shaping objects (e.g., blocks, rings, etc). Object 1100 includes a top portion 1105 and a bottom portion 1110. In this embodiment, bottom portion Iii 0 is compressible while top portion 1105 is substantially non-compressible. Thus, when object 1100 is pressed down onto surface 1115, bottom portion 1110 at least partly compresses, as illustrated in FIG. 11B. The compression can be at least about, e.g., 1 mm, 5 mm, 1 cm, 2 cm, or 5 cm. The bottom surface area of object 1100 then expands, which may allow more opportunities for object 1100 to contact surface 1115 and prevent an adjacent food item from leaking through object 1100. This thickness expansion can be at least about, e.g., 1 mm, 5 mm, 1 cm, 2 cm, or 5 cm.

Bottom portion 1110 may include a non-rigid material, a thin or weak material, a deformable material, a metal, silicon, etc. In some embodiments, bottom portion includes a similar or a same material as in top portion 1105 but lacks a support present in top portion 1105. For example, top portion 1105 may include an interior with one or more supports (e.g., vertical supports, such as rigid rods) and an outside layer or coating (e.g., comprising a metal, aluminum foil, silicon, silicone, etc.). Bottom portion 1110 may share the outside layer or coating with top portion 1105 and/or lack the supports. In some instances, bottom portion 1110 does not share a component with top portion 1105 (e.g., such that top portion 1105 includes supports and an outside layer, and bottom portion 1110 has neither). In some embodiments, top portion 1105 and bottom portion 1110 have different compositions (e.g., top portion 1105 composed primarily or completely from metal and bottom portion 1110 composed primarily or completely of silicone). Bottom portion 1110 may or may not be substantially solid. For example, bottom portion 1110 may share an outside layer with top portion 1105. Bottom portion may lack internal supports, and thus, the layer may form a loop of material (e.g., shaped in a U in a non-compressed state, with the top of the U meeting top portion 1105). The loop may be void of any interior material (resulting in air space within the loop), or another material may fill the loop (e.g., silicon). In some instances, bottom portion 1110 comprises a single sheet of material (e.g., a thin sheet of metal or silicon) that is flat in an uncompressed state.

Figure 12:
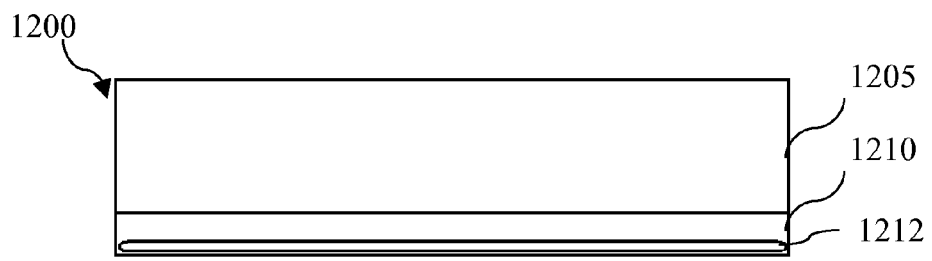
FIG. 12 illustrates an example section of multi-portion object, according to some embodiments of the invention.

FIG. 12 illustrates an example section of multi-portion object 1200 (e.g., a cake-shaping object). As illustrated, the object comprises a strip, though the concept could be extended to other objects or cake-shaping objects (e.g., blocks, rings, etc). Object 1200 includes a top portion 1205 and a bottom portion 1210. In this embodiment, bottom portion 1210 includes a magnetic component 1212. The magnetic component may include one or more magnetic strips (e.g., each extending an entire length of the object or extending for various portions of the length), discrete magnets (e.g., located at regular intervals or in direct contact with adjacent magnets), etc. In some instances, object 1200 does not include a separate magnetic component but may have or include a component that has a high magnetic permeability (e.g., causing the object, or a bottom of the object, to be attracted to a magnet). In some instances, object 1200 includes a metal sheet (e.g., being parallel or perpendicular to a height of the object).

The magnetic component or component with high magnetic permeability may be within the bottom portion 1210 or outside the bottom portion. For example, in one embodiment, the object includes a top portion, a bottom portion below the top portion, and a magnetic strip below the bottom portion. Bottom and/or top portions 1210 and/or 1205 may have one or more characteristics described with respect to bottom and/or top portions 1110 and/or 1105. For example, top portion 1105 may include rigid vertical supports and an outside layer or coating, and bottom portion 1210 may include an interior magnetic strip, may have or lack vertical supports and may share the outside layer with top portion 1205. In some instances, lower portion 1210 consists of magnetic component 1212 or a component with high magnetic permeability. In some instances, surface 1115 is magnetic and strip 1100 includes a metal.

Object 1200 may be positioned on or over a surface. The surface may be, a top surface of a mat, a top surface of a cookie sheet, a top surface of a cake pan, etc. The surface may, e.g., have a high magnetic permeability, be magnetic or comprise a magnet. Thus, magnetic component 1212 may attract object 1200 (e.g., a bottom of object 1200) to the surface. Space between a bottom of object 1200 and the surface may then be reduced and a food item will be less likely to leak through (e.g., underneath) object 1200.

Figure 13:
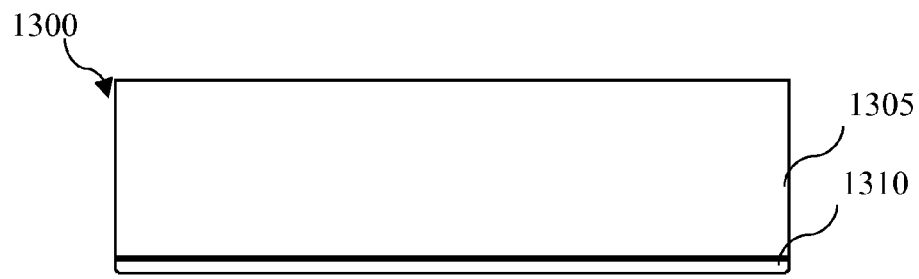
FIG. 13 illustrates an example section of multi-portion object, according to some embodiments of the invention.

FIG. 13 illustrates an example section of multi-portion object 1300 (e.g., cake-shaping object). As illustrated, the object comprises a strip, though the concept could be extended to other objects or cake-shaping objects (e.g., blocks, rings, etc). Object 1300 includes a top portion 1305 and a bottom portion 1310. Bottom portion 1310 may be configured to improve a barrier formed between object 1300 and an underlying surface. For example bottom portion 1310 may include an adhesive material, a tacky material, silicon, silicone, etc. Bottom portion 1310 may be configured such that a bottom surface of bottom portion 1310 has a relatively large surface area and/or is rather rough (e.g., compared to a metal or surface of top portion 1305).

In some instances, bottom portion 1310 may be a fixed and stable portion of object 1300. Thus, for example, a user may purchase object 1300 and bottom portion 1310 is included in object 1300. In some instances, bottom portion 1310 is applied shortly before a user wishes to use object 1300 (e.g., before shaping object 1300 or positioning it on a surface). It may or may not be possible to separate top portion 1305 from bottom portion 1310. For example, in one embodiment, bottom portion 1310 is reapplied to a bottom surface of top portion 1305 before each use. Bottom portion 1310 may then be separated from top portion, e.g., by applying opposing forces to the portions, washing object 1300, etc. In some instances, the portions are substantially inseparable (e.g., a silicone bottom layer is tightly adhered to a top layer).

Object 1300 may be positioned on or over a surface. The surface may be, a top surface of a mat, a top surface of a cookie sheet, a top surface of a cake pan, etc. The surface may be, e.g., metallic, comprise silicon or silicone, have a tacky surface, a rough surface, a smooth surface, and/or an adhesive surface. Bottom portion 1310 may be configured such that, e.g., there is increased friction between object 1300 and an underlying surface. For example, a tacky bottom surface on object 1300 may inhibit or prevent an object from shifting relative an underlying surface (e.g., while another segment of the object is being shaped). This may allow object 1300 to retain tight contact with an underlying surface and prevent or deter a food item from leaking through the object.

In one embodiment, object 1300 has a rough bottom surface and/or an underlying surface has a rough top surface. This may increase the possibility that at least part of the object's bottom surface is in contact with the underlying surface. Even if it is not, the rough surface(s) may increase a path that a food item would need to traverse before it could escape through object 1300. Thus, the rough surface(s) may prevent or deter a food item from leaking through the object.

As described above, objects and/or cake-shaping objects described herein may include an object described in U.S. application Ser. No. 12/413,509, which is hereby incorporated by reference in its entirety. For example, an object may include a moldable substance or a strip. The object may be configured such that it may be shaped by a user (e.g., to form a perimeter wall, which may, in practice, serve as a wall of a cake pan). The object may be configured such that it can maintain its shape at high temperatures, such as temperatures between about 150-500, about 200-400 or about 300-400 degrees Fahrenheit. The object may or may not be edible.

The object may include a strip. The thickness of a strip may be, for example, at least about, about, and/or less than about 5, 3, 2, 1, ½, ¼, ⅛, 1/16, or 1/32 inches. The height of a strip may be, for example, at least about, about, or less than about 16, 8, 6, 4, 3, 2, 1, ½, ¼ or ⅛ inches. In one embodiment, the strip has a thickness of about ¼-1 inch and a height of about 1-6 inches. In some instances, a strip comprises a plurality of inter-locking strip segments. This may allow a user to adjust a length of a strip. Each individual segment may or may not be flexible and may or may not include a plurality of supports (as described below), such as vertical supports. The support segments may interlock, e.g., using one or more: clasps, adhesive material, a rod on an end of one strip and a rod-covering tube (which may have a small vertical opening) on an end of an adjacent strip, a lock, overlap and compression of adjacent strips, compression of adjacent strips, pinching the strips together, etc.

Figures 14A, 14B:
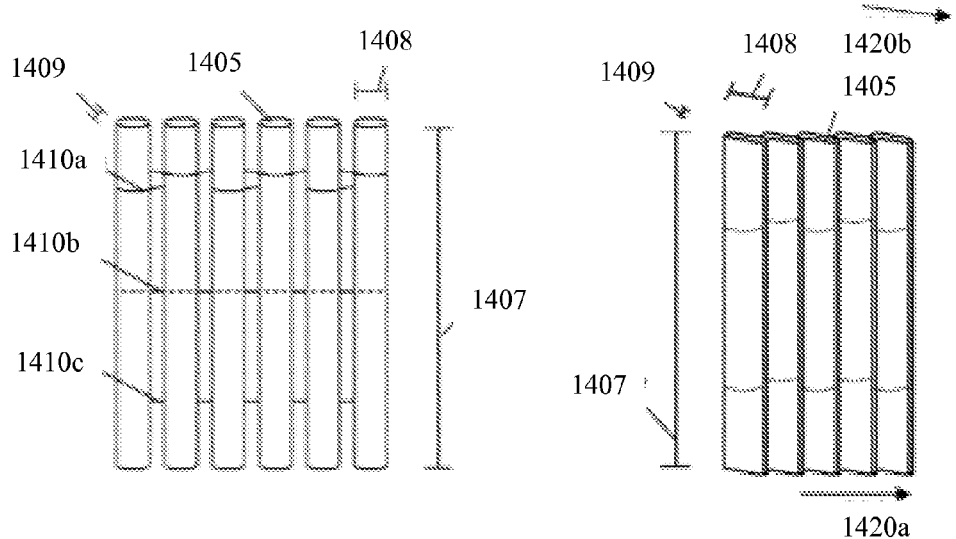

The strip may include a plurality of supports. FIG. 14A illustrates an example of at least part of a strip. The illustrated strip includes a plurality of supports 1405. The strip may comprise at least about, about, or less than about 1, 2, 3, 5, 10, 20, 30, 50, 100, 200, 300, 500, 1,000, 2,000, or 5,000 supports 1405. The average density of supports per unit length of the strip may be at least about, about, or less than about 1, 2, 3, 4, 5, 6, 8, 10, 20, 50 or 100 supports per inch. In one instance, a strip has a density of about 1-10 supports (e.g., vertical supports) per inch. Supports 1405 may be vertical supports. Supports 1405 may be configured and spaced such that the supports can move relative to each and a group of supports can be formed into a variety of shapes.

Figures 14C, 14D, 14E:
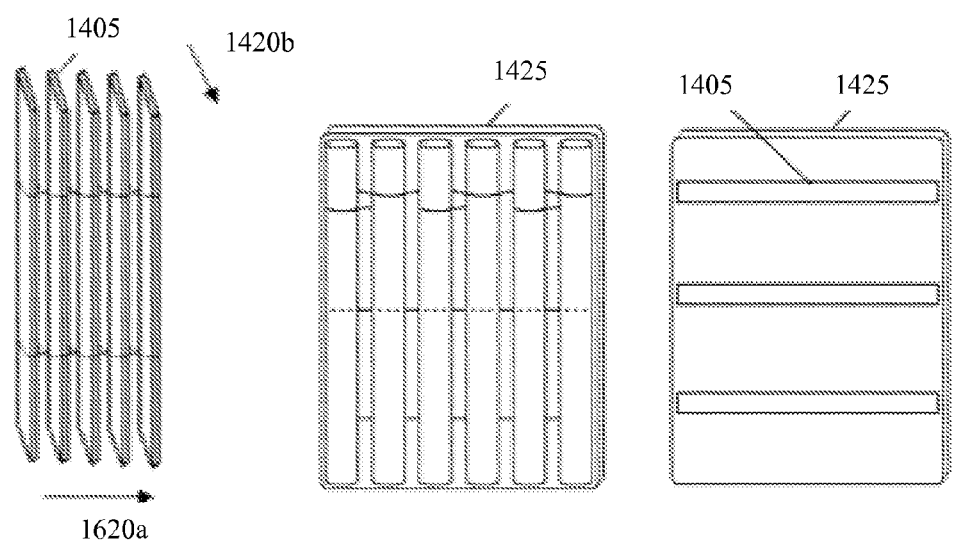

A support 1405 may have a length 1407 that is at least about 1, 2, 5, 10, 15, 20, 50, 100, 500 or 1,000 times its width 1408 and/or its thickness 1409 (e.g., a length that is at least about 100 times its thickness and its width or a length that is at least about 100 times its thickness and about 5-100 times its width). Support 1405 may have a circular cross section, as illustrated in FIG. 8A, wherein width 1408 and thickness 1409 are substantially equal to a diameter of a circle. In other embodiments, support 1405 has a rectangular, a planar cross section, and/or at least one substantially flat surface. An example of a support 1405 with a planar cross section is illustrated in FIG. 14C. Width 1408 of support 1405 may be at least about 0.5, 1, 2, 5, 10, 15, 20 or 50 times thickness 1409 of support 1405. Width 1408 and/or thickness 1409 may be greater than about, about, or less than about 1 mm, 2 mm, 5 mm, 1 cm, 2 cm, 5 cm, 10 cm, 100 cm, 200 cm, 500 cm. Length 1407 may be greater than about, about, or less than about 1 cm, 2 cm, 5 cm, 10 cm, 100 cm, 200 cm, 500 cm. In some embodiments, width 1408 and thickness 1409 are between about 1 mm and about 2 cm. In some embodiments, length 1407 is between about 2 cm and about 10 cm.

Support 1405 may comprise, e.g., a metal (e.g., aluminum, tin, copper, or stainless steel), wood (e.g., bamboo), and/or silicon. The composition of the vertical support 1405 may or may not be such that it can withstand, does not burn, and/or does not release harmful chemicals at high temperatures, such as temperatures above 300 degrees Fahrenheit. A composition may be such that support 1405 would itself burn at high temperatures but does not burn (and/or is not harmful or toxic) if substantially or completely covered by another material (e.g., a material that is to cover the support in the strip, such as a material of an outside layer). In some instances, support 1405 may be substantially or completely rigid, such that it does not easily bend or does not bend at all (e.g., along the length dimension). Vertical supports 1405 may or may not be individually end-supporting, such that each can stand on its end for sustained periods of time without other support.

In one embodiment, supports 1405 are connected together. They may be directly connected or indirectly connected. They may be directly connected, e.g., by connecting adjacent supports 1405 to each other using one or multiple pieces of string 1410, as illustrated, for example, in FIGS. 14A-14B. String 1410 may wrap fully or partly around a first support and then wrap fully or partly around a second support, such as shown by string 1410a in FIG. 14A. String 1410 may also or alternatively extend through a first support and extend through a second support, such as shown by string 1410b in FIG. 14A. String 1410 may attach to a first support and attach to a second support, such as shown by string 1410c in FIG. 14A. String 1640 may attach to a first and second support through a combination of the above-described attachments (e.g., extending through a first support and attaching to a second support). String 1410 may be replaced by a connector. The connector may be floppy (e.g., like a string), flexible, or semi-rigid. The connector may, e.g., be a string or wire. The connector may comprise a rigid, pivotable component. For example, the connector may comprise a hinge. The connector may be such that adjacent supports 1405 can be moved into different positions relative to each other.

In some embodiments, the connector or all connectors connecting supports of an adjacent support pair does not substantially constrain first angular relative positions of adjacent supports 1405, the first angular relative positions being along a plane perpendicular to the length 1407 of a first support of an adjacent support pair. Nevertheless, the connectors may or may not inhibit movement of adjacent supports or provide at least some constraint of the first angular relative positions of adjacent supports. For example, a high-friction element, such as a hinge, a wrapped wire, etc. may be used to create some constraint while still allowing movement. This may allow a user to be able to form a strip into a shape and also allow the strip to keep a formed shape.

The connector may constrain the relative positional difference of adjacent supports 1405. For example, the connector may constrain the supports, such that adjacent supports may not be separated by a space more that about 1 mm, 5 mm, 1 cm, 2 cm, 5 cm or 10 cm. In another example, the connector may constrain the supports, such that adjacent supports may not be separated by a space more than about .0.01, 0.02, 0.05, 0.1, 0.2, 0.5, 1, 2, 5, 10, 20, 50, 100 or 1000 times the average diameter of the adjacent supports. In some embodiments, one or more connectors may fix the distance between adjacent supports. In others, it does not. In this way, a group of supports 1405 may be formed into different shapes. As illustrated, e.g., in FIG. 14A, multiple connectors may be used to connect adjacent supports 1405, which may constrain and/or fix second angular relative positions of adjacent supports, the second angular relative positions being along a plane perpendicular to width 1408 of a first support and/or a plane perpendicular to thickness 1409 of a first support of an adjacent support pair.

In some embodiments, such as those in which the supports 1405 do not comprise substantially circular cross sections, (e.g., as illustrated in FIG. 14B), adjacent supports may be connected by a connector that extends through a width of one or more supports 1405, extends through the thickness of one or more supports 1405, attaches to a support side along the width dimension, and/or attaches to a support side along the thickness dimension. Adjacent supports may be rotatable relative to vector 1420a extending from a center of a first support to a corresponding second support. For example, when a connector is pulled tightly, vector 1420b extending along the direction of the first and/or second support's width may be substantially parallel to vector 1420a extending from a center of the first support to a corresponding vector of the second support, as illustrated in FIG. 14B. While FIG. 14B illustrates adjacent supports 1405 as overlapping, in other embodiments, they do not. When the connector is not pulled tightly, vector 1420b extending along the direction of the first and/or second support's width may be more perpendicular to vector 1420a between the supports' centers, as illustrated in FIG. 14C. Supports 1405 and connectors may be configured such that at least a portion of the supports 1405 overlap with at least another portion of adjacent supports 1405 for at least some formations that the supports may be shaped into, as illustrated, for example, in FIG. 14B.

A connected group of supports 1405 may be end-supporting. A connected group of supports 1405 may be semi-end supporting, such that they do not remain on their ends when the group is positioned along a straight line but they do when in a curved or cornered shape. A connected group of supports 1405 may or may not be configured such that there is substantially no shape memory (meaning that it has substantially no tendency to restore to a prior shape after having been shaped, bent or deformed) or no default shape of the group. In this instance, if the group of supports 1405 is formed, for example, into a "U-shape" or a "V-shape", it would not have the tendency to revert back to a straight line.

As illustrated in FIG. 14D, supports may be connected to, at least partly surrounded by, surrounded by, encased by, at least partly covered by, or covered by an outside layer 1425. Outside layer 1425 may comprise, e.g., a metal (e.g., aluminum, tin, copper, or stainless steel), silicon and/or silicone. In some embodiments, outside layer 1425 comprises a material not comprised in supports 1405. In some embodiments, outside layer 1425 and supports 1405 are made from different materials. Outside layer 1425 and supports 1405 may have: a similar or identical material composition, one or more same materials within their respective compositions (e.g., both may include aluminum or silicone), or no same materials. The composition of outside layer 1425 may be such that it can withstand high temperatures and/or such that it is safe to be in contact with food. Outside layer 1425 may or may not comprise a non-stick material. Outside layer 1425 may or may not be flexible, stretchable and/or at least semi-resilient (e.g., based on a material and/or thickness).

Outside layer 1425 may fully surround a group of supports 1405; fully cover one side of the group and not the other; fully cover one side and part of the other; partly cover both sides; or only partly cover one side. Outside layer 1425 may or may not substantially cover a bottom and/or top end. Outside layer 1425 may be connected to the supports, e.g., by layer-support connectors, or the spatial arrangement (e.g., encasement by the outside layers 1425) may serve to physically tie the layer 1425 with supports 1405. The layer-support connectors may comprise an above-described connector. For example, a string or wire may be used to tie supports 1405 to the outside layer 1425. In some cases, supports 1405 are glued or welded or adhered to the outside layer 1425. A liquid composition may be poured over supports 1405, wherein the molten composition subsequently hardens (e.g., upon cooling) to form outside layer 1425.

Outside layer 1425 may be flexible and/or malleable. Outside layer 1425 may or may not be such that it has substantially no shape memory or no default shape. For example, if it has substantially no shape memory or default shape, it may not have a tendency to revert back to a flat plane after being creased, folded or formed, for example, into a "U-shape" or a "V-shape". Outside layer's 1425 shape may be substantially controlled by the relative positions of the supports 1405. In some instances, multiple outside layers 1425 are provided. For example, a first outside layer may have a tendency to retain a formed shape, and a second layer may cover the first layer (e.g., coat or wrap around the first layer) and have shape memory, a smooth surface for easy cleaning, and/or an attractive appearance).

Outside layer 1425 may have a thickness of less than about, about, or more than about 0.01 mm, 0.02 mm, 0.05 mm, 0.1 mm, 0.2 mm, 0.5 mm, 1 mm, 2 mm, 5 mm, 1 cm, 2 cm or 5 cm (e.g., about 0.1 mm-1 cm). Outside layer 1425 may or may not be of uniform thickness. For example, the outside layer may gradually increase its thickness towards the base of the strip.

In some embodiments, outside layer 1425 comprises a plurality of grooves 1505, as illustrated in FIGS. 15A-15C. A cross-section of grooves 1505 may be, for example, triangular (e.g., as illustrated in FIGS. 15A-15C) or rectangular. Grooves 1505 may extend along the height direction of the outer layer 1425 (e.g., along the direction of the vertical supports 1405). Grooves 1505 may extend along the entire height of the outside layer 1425 or along part of it. Grooves 1505 may be such it is easier to bend the outside layer 1425 As illustrated in FIGS. 15B-15C, a cross sectional area of grooves 1505 may expand or contract as the outside layer 1425 is bent. The grooves may allow a thicker piece of material to be used for the outside layer than could otherwise achieve a similar malleability.

One, both or neither side of outside layer 1425 may comprise grooves 1505. For example, only a side of layer 1425 not positioned next to a food item comprises grooves 1505. A smooth surface on a side next to the food item may prevent the food item from becoming trapped in the grooves or from distorting the shape of the food batter. In some embodiments, an outside layer 1425 is surrounded by a second outside layer, e.g., to provide a smooth surface. The second outside layer may be at least about 2, 5, 10, 20, or 50 times thinner than the outside layer 1425. Thus, e.g., a strip may comprise the outside layer 1425 with grooves 1505 with or without supports 1405 and with or without a second outside layer.

Some examples of the advantages that the outside layer 1425 may provide include that the outside layer 1425 may inhibit or prevent the burning of one or more supports, inhibit or prevent adjacent substances (e.g., cake batter) from being caught between the supports, improve the ease by which the strip can be cleaned, provide smooth boundaries for substances formed nearby (e.g., providing smooth boundaries for a cake formed by pouring cake batter inside a shape formed at least partly by the strip), provide a food-safe surface, and/or inhibit or prevent the supports 1405 from suffering from water damage. Some examples of the advantages that the supports 1405 may provide include that the supports 1405 may inhibit the outside layer 1425 from completely or partly collapsing, improve the vertical straightness of boundaries for substances formed nearby (e.g., improving the top-to-bottom straightness of cakes formed by pouring cake batter inside a shape formed at least partly by the strip), improve a smoothness of the boundaries for substances formed nearby (e.g., by preventing unintended jarring shape changes in the formed shape), reduce a thickness that would otherwise be required for the outside layer 1425 to hold its shape, and/or make it easier to form the strip in the desired shape.

In some embodiments, a group of supports 1405 which may or may not be attached to an outside layer 1425 is fully or partly coated or encased with outside layer 1425. In some embodiments, supports 1405 and outside layer 1425 are made of substantially similar materials (e.g., silicone or a metal, such as aluminum). A greater thickness of supports 1405 may provide for greater rigidity than outside layer 1425 has. Outside layer 1425 and supports 1405 may thus, in some embodiments, be formed as a single piece. In some embodiments, outside layer 1425 is not connected to, at least partly surrounding, at least partly enclosing or at least partly covering the supports. For example, outside layer 1425 may be thicker and not be connected to supports 1405. In some instances, outside layer 1425 is connected to non-vertical supports. For example, one or more supports 1405 may run along the length of the outside layer 1425, as illustrated in FIG. 14E. In such an embodiment, supports 1405 may, e.g., be flexible, malleable and/or semi-rigid. Supports 1405 may restrict the configuration of outside layer 1425.

In some embodiments, supports 1405 are not connected to each other using connectors 1410. Instead, the supports 1405 may be, e.g., indirectly connected to each other via the outside layer 1425. For example, supports 1405 may be connected to outside layer 1405, such that relative movement of the supports 1405 is restricted by the outside layer 1405. In another instance, outside layer 1405 partly or fully surrounds the strips, again restricting their relative movement.

FIG. 14F illustrates another embodiment of a strip. In this instance, a strip includes a plurality of vertical supports. Adjacent vertical supports are coupled, e.g., by one or more outside layers 1425. In one embodiment, a strip includes a plurality of outside layers 1425. For example, in the example illustrated in FIG. 14F, supports 1405*a* and 1405*b* are coupled via outside layer 1425*a*, supports 1405*b* and 1405*c* are coupled via outside layer 1425*b*, etc. In some embodiments, three, more or all vertical supports 1405 are coupled via a single outside layer 1425 (e.g., outside layers 1425*a*, 1425*b*, etc. may be combined into a single layer). As another example, in the example illustrated in FIG. 14F, a single pair of adjacent supports are coupled via a plurality of outside layers. Thus, as illustrated, supports 1405*a* and 1405*b* are coupled via a front outside layer 1425*a* and a back outside layer 1425*a*'. In some embodiments, a pair of supports is coupled via only a single outside layer 1425. In some embodiments, a pair of supports is coupled via a front and back outside layer, which, e.g., are a same layer (e.g., connected across a top and/or bottom of the strip). FIG. 14F illustrates an embodiment in which the top of the strip is not covered by an outside layer 1425. In some embodiments, it is. For example, a single layer may extend from the across the front to the back (e.g., wrapping around the top and/or bottom of the strip), or one or more separate layers may wrap around or be positioned on or over a top and/or bottom of the strip.

Outside layer(s) 1425 may be coupled to vertical supports 1405 through a variety of means. For example, an edge of an outside layer 1425 may be fixedly connected to a surface of the support. In one instance, the edge is connected to the support using an adhesive. In one instance, an outside layer 1425 may be deposited or positioned on a surface, and one, two or more vertical supports 1405 may be formed on the layer. In another instance, a non-solid outside layer material may be deposited on a surface and before it hardens, one, two or more vertical supports 1405 may be positioned on the material. In some embodiments, the support-layer combination may then be positioned such that the supports are under the layer. The supports may then be positioned on another non-solid outside layer material before the material hardens, such that layers are formed on both sides of the supports. In one instance, supports 1405 and outside layer 1425 have a same or similar composition and thus may, e.g., be formed and/or shaped simultaneously (e.g., using a mold).

Supports may be separated by a variety of distances. For example, adjacent supports may be separated by a space no greater than about 1 mm, 5 mm, 1 cm, 2 cm, 5 cm or 10 cm. In another example, adjacent supports may be separated by a space no greater than about .0.01, 0.02, 0.05, 0.1, 0.2, 0.5, 1, 2, 5, 10, 20, 50, 100 or 1000 times the average diameter of the adjacent supports. In some instances, there is substantially no space between adjacent supports. In some embodiments, the strip includes no supports or no vertical supports. For example, one strip may include an outside layer (e.g., only an outside layer), such as one illustrated in FIGS. 15A-15C, and no vertical supports.

In some embodiments, a strip may be configured to not allow for layer(s) 1425 to collapse inwards/outwards between supports 1405. For example, layer(s) 1425 may be sufficient rigid or thick to prevent or inhibit such collapse. In some instances, an additional material is provided behind a layer 1425 (e.g., between layers 1425*a* and 1425*a*' in FIG. 14F). The additional material may be, e.g., less or more dense than layer 1425. In some instances, space between adjacent supports is filled with a material similar to or the same as a material of layer(s) 1425 (e.g., which may form a uniform and solid filler between adjacent supports). Layer(s) 1425 may comprise a stretchable material. In one instance, a plurality of vertical supports are aligned (e.g., with or without space between supports), and the supports are completely coated (e.g., with a coating less dense than the supports, e.g., a silicone coating, a coating comprising aluminum and/or one or more other substances, etc.).

A strip with opposing outside layers, such as the strip illustrated in FIG. 14F, or with a solid filler may improve the strip's ability to be supported on its end and not collapse. In some embodiments, the opposing outside layers are discrete (e.g., not forming a continuous layer). In some embodiments, the opposing outside layers are not discrete. For example, a single layer may be formed that wraps from the back of the strip around to the front of the strip (and/or, in some instances, around the bottom of the strip).

In some embodiments, a strip is joined at its ends, to form a closed shape. Thus, the strip may be provided, e.g., in a flexible band. In other instances, the strip is not provided in a closed shape, but can be formed (by itself or in combination with other strips) into a closed shape and "closed", for example, by clipping ends together, wrapping a portion of a first end around a portion of a second end, pinching a first end into the second end, or using a third layer or device to hold the ends together. In one instance, a shape is formed with the strip, and first and second opposite portions of the strip overlap. An end of one or both portions may be attached to the other portion (e.g., by pinching the portions together, clipping them together, wrapping an item around both portions, etc). The strip may be joinable and/or of an adhesive character, such that an end of one strip can join with an opposite end of the strip, an end of a different strip and/or a side of a container without a mechanical fastening component (e.g., a clamp, hinge, or fastener). The strip may be configured such that side edges adhere to each other (e.g., upon application of pressure to join the ends). In other conditions, an additional adhering component may be used to join the ends.

The strip may be configured to attach to another strip, itself and/or a surface. For example, a first end of a first strip may be configured to attach to an opposite end of the same strip, such that a closed shape can be formed. In one instance, a plurality of strips is attached to each other to form a closed shape. In another example, one or more strips may be configured to attach (e.g., adhere, seal with, or closely contact) a side of a pan or container. A strip may attach to itself, another strip and/or a surface due at least in part to the stickiness of the strip. For example, one end of the strip may be pushed against another end of the strip, causing the two ends to stick together. The attachment may be such that one or more strips form a closed shape and such that a cake batter, or other initial food item, positioned inside the shape will not leak through an interface near a vertical strip edge Another component may be used to attach a strip end to another strip end or to a surface. For example, a moldable substance, a clay-like substance, a food-safe adhesive and/or a sticky substance may be applied to a strip end before contacting the end with another strip end. As another example, a mechanical element such as a Velcro® closure can be used to attach strip ends.

A strip may be configured to be rolled. In some embodiments, a strip can be rolled up without substantial cracking of the strip. In some embodiments, two ends of a strip are attached, such that a closed shape (e.g., a band or ring shape) is formed. In some embodiments, the length of a strip may be dynamically adjusted. For example, a strip may be cut or torn into a plurality of segments.

The strip may be configured such that it may be formed along substantially any two-dimensional shape. The strip may or may not be reusable. For example, it may be reusable for a finite (e.g., 2, 3, 5, 10, or 50) number of times or for an essentially limitless number of times. In some embodiments, the strip is dishwasher safe. The strip may weigh less than about 1, 2, 4, 8, 16, or 32 ounces.

In some embodiments, the thickness of the strip is substantially uniform, while in other embodiments, the thickness varies. For example, the thickness may taper at the ends of the strip. The strips may be edge-supported, meaning that the strip is configured to be or can be shaped to be supported on one of its edges. The edge-supported strip may be free-standing. In some instances, a thickness of the strip is or can be shaped to be sufficient to balance on its edge. A base of a strip may be configured to make the strip edge supported. For example, the base may comprise a sticky material. In some instances, the bottom of the strip near the edge is moldable and can be pressed into contact with a surface, further supporting the strip. In some instances, additional components, such as a moldable substance, may be used to help provide further support to an edge-supported strip. For example, a clay-like material or a moldable substance may be positioned along the base of a strip in order to keep the strip standing vertically and/or along the desired shape. An edge is defined as a face of the strip, wherein there are at least two other "non-edge" faces that have a larger surface area than the edge. For example, an edge-supported strip may be a strip configured to stand vertically, for example, without support from other components. The edge-supported strip may be configured such that it is capable of maintaining its vertical stance despite an expansion of an initial food item (e.g., during baking), which thereby applies force to a side of the strip.

The strip may be characterized by a length, a width and a thickness, wherein the strip is at least as long as it is wide and at least as wide as it is thick. The strip may have a length-to-width, a length-to-thickness ratio, and/or a width-to-thickness ratio of at least about, about and/or less than about 1, 1.5, 1.75, 2, 2.5, 3, 3.5, 4, 4.5, 5, 6, 7, 8, 9, 10, 15, 20, 30, 40, 50.

In some instances, a food item is positioned such that it is in direct contact with an object (e.g., a cake shaping object or strip) and/or a mat. Positioning a food item, as used herein, may refer to, e.g., placing a food item (e.g., after having picked it up from a former location and transporting it to the new location), pouring the food item, spreading the food item, dropping portions of the food item, etc.

The object and/or mat may be configured such that, e.g., subsequent to baking the food item and object and/or mat, the object and/or mat may be easily separated from the baked food item while preserving an integrity of the baked item (e.g., such that a resulting cake is not torn during the separation). In some embodiments, an object and/or mat may be greased (e.g., using cooking spray), a food item may then be positioned in direct contact with the object and/or mat, the food item and object and/or mat are baked, and then the object and/or mat may be easily separated from the food item while preserving an integrity of the baked item.

An object and/or mat may be coated with an agent. For example, an object and/or mat may be coated with an oil, sprayed with a cooking spray, and/or dusted with flour and/or powdered sugar after the substance has been formed to a desired shape. The coating may aid in the separation between the object and/or mat and an item.

Use of a food-shaping or cake-shaping object may allow a user to make a food (e.g., a cake) in a shape that he wants. Using a food-shaping object may have advantages over, e.g., cutting a cake. For example, a user may be able to repeatedly alter a shape using the object before committing to a final shape. Thus, a user may be more satisfied with a final shape of an, e.g., baked food item. Less cake batter may be required, as none of the cake would be wasted by portions cut away. Smooth edges may be produced, which may lead to less difficulty in frosting/decorating, e.g., a cake.

A variety of shape-assistance objects may be provided. In some instances, an imprinter is provided. The imprinter may have a surface area of a desired food-item shape (e.g., an area approximately the same as a top-down area of a desired cake) and/or a surface area of a desired object positioning shape (e.g., an area corresponding to a top-down shape of the regions in which an object should be placed to defined the desired cake). As a very simplistic example, if a user wished to use a cake-shaping strip (with, e.g., a 0.5-inch thickness) to make a 9-inch circular cake), an imprint may have a surface area of: a circular shape of any size (e.g., to serve as an unscaled model for a user to create a similar shape), an 8-inch solid circular shape, a 9-inch solid circular shape (corresponding to the desired-cake region and a surround strip region), or a ring with a 9-inch outer diameter and an 8-inch inner diameter (corresponding to a surround strip region).

An imprinter may cause a mat to collapse or deform in a desired region. For example, a weight of the imprinter may cause it to sink into the mat, or a user may press down into the imprinter (causing it to sink into the mat). Then, e.g., a food item may be poured into that region and (e.g., after baking) a resultant food item may have a surface area similar or identical to that of the imprinter. Alternatively or additionally, an object (e.g., a cake shaping object) may be positioned along the region, on an outer portion of the region, or along a neighboring region adjacent to the object.

Figure 16A:
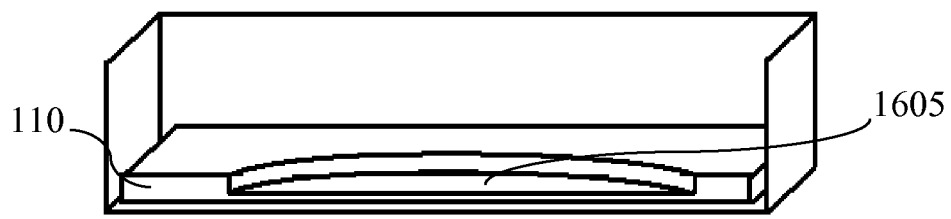
FIGS. 16A-16B illustrate an example of a compressed portion of a mat, according to some embodiments of the invention.
Figure 16B:
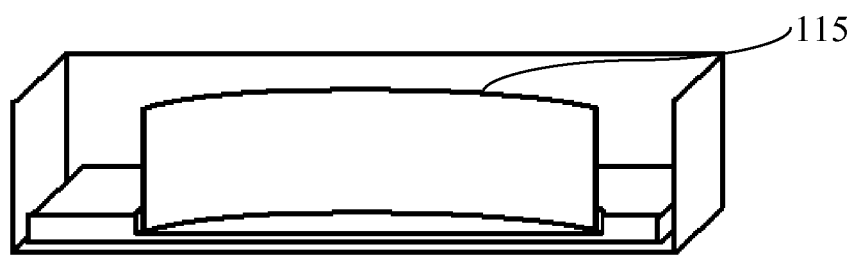

FIGS. 16A-16B illustrate an example of an indented portion 1605 of mat 110. In this example, indented portion 1605 comprises a solid circular shape. FIG. 16B illustrates a strip cake-shaping object 115 that is positioned along an outer edge of the indented portion 1605. Then, e.g., cake batter may be poured into an area inside the positioned object. In other embodiments, object 115 may be positioned outside of the indented portion 1605. In yet other embodiments, no object 115 is included. For example, a cake batter may be poured directly into the indented portion 1605.

Figure 17A:
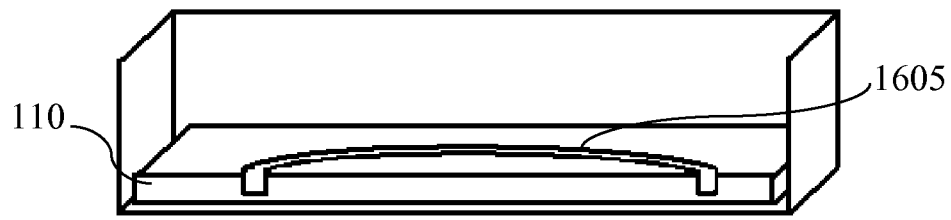
FIGS. 17A-17B illustrate an example of a compressed portion of a mat, according to some embodiments of the invention.
Figure 17B:
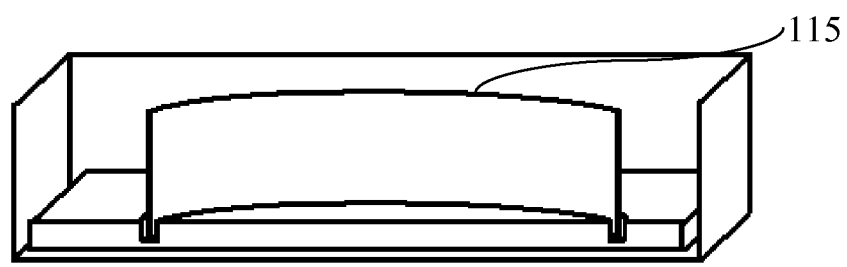

FIGS. 17A-17B illustrate another example of an indented portion 1405 of mat 110. In this example, indented portion 1405 comprises a ring. FIG. 17B illustrates a strip cake-shaping object 115 that is positioned along the indented portion 1605. Thus, here, the indented portion forms a track or indention along which object 115 may be placed. An area within the shape formed by the object may or may not also be compressed. Then, e.g., cake batter may be poured into an area inside the positioned object.

Indentions 1605 in FIGS. 16A and 17A may be formed by an imprinter. The imprinter may have a fixed (e.g., non-rectangular and/or non-circular) shape. For example, a surface area or perimeter of the imprinter may be a non-rectangular shape (e.g., a "1", a heart shape, a ghost shape, etc.). In some embodiment, an imprinter is, e.g., rectangular but comprises a protrusion of non-rectangular shape (e.g., one or more sheets of paper, parchment paper or foil, with an outline of a "1", a heart shape, etc. on the imprinter). In some embodiment, an imprinter is, e.g., rectangular but comprises an outline of non-rectangular shape (e.g., one or more sheets of paper, parchment paper or foil, with a surface-level outline of a "1", a heart shape, etc. on the imprinter). A user may or may not be instructed to cut around or tear apart (e.g., using perforated edges) a shape to form a final imprinter.

In some instances, an outliner is used in addition or in place of an imprinter. The outliner may include a material itself having a desired shape. In some embodiments, the outliner comprises a standard (e.g., rectangular) shape and has, e.g., a line drawing, colored drawing, etc. For example, the outliner may comprise a rectangular outer shape with an outline drawing of a heart on the outliner. The outline drawings may include lines of a thickness substantially similar to or smaller than, e.g., a thickness of a cake-shaping strip. A user may or may not be instructed to cut around or tear apart (e.g., using perforated edges) a shape to form a final outliner.

An object (e.g., a cake shaping object) may then be positioned next to or along a perimeter of the outliner. For example, an outliner with an outer perimeter in a desired shape (e.g., a heart) may be positioned on a surface (e.g., a cake-pan or cookie-sheet surface), and a cake-shaping strip may be shaped along or around a perimeter of the outliner. As another example a standard-shape (e.g., rectangular) outliner may be positioned on a surface (e.g., a cake-pan or cookie-sheet surface), and a cake-shaping strip may be shaped along one or more borders (e.g., line drawings) on the outliner. In some embodiments, the outliner is substantially flat. In some embodiments, the outliner includes, e.g., indentations along which objects (e.g., cake-shaping objects) may be positioned.

The imprinter or outliner may comprise, e.g., a metal, silicon, silicone, plastic, parchment paper (which may have a thickness equal to or greater than store-bought parchment paper), aluminum foil (which may have a thickness equal to or greater than traditional aluminum foil), paper (which may have a thickness equal to or greater than traditional paper), cardboard, etc. Heavier imprinters may allow the imprinter or outliner to itself compress a mat and may allow reuse of the imprinter or outliner. However, it may be more expensive to produce such products. Thus, if it is envisioned that a user would want to make a variety of shapes, it may be advantageous to provide a cheaper imprinter/outliner, e.g., on paper. Further, as described in greater detail below, an outliner or imprinter may be provided, e.g., by using the Internet. In such instances, it may be advantageous to provide for paper-based imprinters or outliners (e.g., by providing documents including one or more images that may be printed on one or more sheets of paper, such as standard typing paper). The imprinter or outliner may or may not be food-safe and/or able to withstand high temperatures (e.g., of up to and including about 300 or 500 degrees Fahrenheit).

An imprinter or outliner may or may not be removed from an underlying surface (such as a cookie-sheet surface, cake-pan surface or mat surface), e.g., before a food item is positioned (e.g., over an area at least partly defined by a cake-shaping object) and/or before subject the food item to a processing step (e.g., baking, freezing, etc.). For example, an outliner may comprise one or more sheets of paper cut into a desired shape. A user can position the outliner (e.g., on a mat, cake-pan surface, cookie-sheet surface, etc.) and shape a cake-shaping object around the outliner. In instances in which the outliner is positioned on a compressible mat, he user may push the object into the mat (e.g., before or after shaping the cake-shaping object). The user may remove the outliner (e.g., subsequent to shaping the cake-shaping object and/or compressing the mat), add batter over an area formed by the object and bake the batter.

In another example, an outliner comprises parchment paper, silicone or a metal in a desired shape. A user can position the outliner (on a mat, cake-pan surface, cookie-sheet surface, etc.) and shape a cake-shaping object around the outliner. In instances in which the outliner is positioned on a compressible mat, he user may push the object into the mat (e.g., before or after shaping the cake-shaping object). The user may add batter over an area formed by the object and bake the batter. Thus, in this embodiment, the outliner is not removed prior to baking the batter. In yet another example, a user may position an imprinter (e.g., on a mat). The imprinter may cause an underlying mat to compress (e.g., based on its own weight or a user applying downwards force on the imprinter) within a particular region of the mat corresponding to the imprinter's shape. A user may remove the imprinter and the cake-shaping object may be shaped along a perimeter of the compressed region. Batter may be added to the region, and the batter may be baked.

The imprinter or outliner may have a thickness greater than about, about, or less than about 0.0001, 0.001, 0.005, 0.01, 0.05, 0.1, 0.25, 0.5, 0.75, 1, 1.25, 1.5, 1.75, 2, 3, 5, 7 or 10 inches. In one embodiment, for example, an outliner or imprinter comprises paper, wax paper, or foil, and has a thickness of less than about 0.01 inches. In one embodiment, for example, an outliner or imprinter comprises, silicone, plastic or a metal (e.g., aluminum) and has a thickness of about 0.1-2 inches or 0.1-0.5 inches.

In some embodiments, a set of outliners and/or imprinters is provided, which may or may not be bound together. The set may include shapes and sizes predicted to generally be of greatest interest to users and/or user-selected shapes. For example, a set may include all or some numbers, all or some letters, and/or a variety of holiday-themed shapes.

In some embodiments, a computer program or a computer readable medium may be used to make the outliner or imprinter. For example, a computer program or a computer readable medium may be used such that the imprinter or outliner may be printed. The imprinter or outliner may be printed on paper or another material. In one instance, the imprinter or outliner may be printed on parchment paper. The parchment paper may be in a standard paper size, such as 8½×11-inches or may be larger to fit into a standard pan (e.g., 13×9-inches or 13×18-inches).

The program or computer readable medium may comprise an input selection component. The input selection component may be configured to display selection options, including selections among a plurality of shapes, event (e.g., Christmas, Valentine's, birthday, etc.), shape sizes, numbers of servings, and/or pan sizes. For example, a number of pan sizes and a number of shapes may be shown to a user. The input selection component may be configured to receive user input. For example, the user may identify one shape and one pan size. The input selection may also be configured to allow a user to import or upload a shape. In some instances, the uploaded shape may be available to other users via a network.

The program or computer readable medium may comprise an image-modifying component. The image-modifying component may, for example, be configured to smooth the lines of the shape, delete shading from the shape and/or increase contrast of the shape. In some instances, the image-modifying component allows the user to draw a shape. The image-modifying component may also be configured to extract an outline from an image or picture. For example, the image-modifying component may be configured to identify borders by analyzing image contrast. The image-modifying component may be configured to smooth and/or straighten a line (e.g., automatically, upon specific user requests, or based upon a user setting).

The program or computer readable medium may comprise a rescaling component. The rescaling component may be configured to rescale a shape (e.g., a user-selected shape) based on a pan size, a shape size and/or a number of servings. In some instances, the width and height of the image are rescaled by equal amounts, while in other instances, the image can be skewed. The thickness of lines of the rescaled drawing may be, for example, at least about, about, and/or less than about ⅟32, ⅟16, ⅛, ¼, ½ or 1 inch (e.g., about ⅛-½ inch). In some instances, the resealing component is configured such that the thickness of the lines does not change proportionally as the drawing is rescaled. In some instances, the thickness of the lines does not change as the drawing is rescaled.

A program or computer readable medium may comprise an output component. The output component may be configured to provide a file to be stored and/or printed, wherein the file comprises a shape and/or rescaled shape. For example, the output component may be configured to provide a document in a portable document format or in an image format. A user may be able to download the document over a network and/or view the document without downloading it. The document may be configured to be printed on a single page or on a plurality of pages. For example, a shape may span 4 sheets of printable material, which may then be positioned relative to each other such that the combined sheets show the complete shape. In some instances, the document may be configured to be printed on paper, while in some embodiments, it may be configured to be printed on another material, such as parchment paper. A portion or all of an image on the printed document may be traced onto other materials (e.g., tracing an outline from one or more sheets of regular paper to that of wax paper).

In some instances, a user is instructed to combine multiple pages to form a shape (e.g., to tape multiple pages together), and/or to cut out a printed shape (e.g., based on its outline) from paper. An imprinter or outliner may include ay of: an original printed version of the shape, a combined printed version of the shape (e.g., after multiple pages including a portion of the shape were combined), a cut-out version of the shape, etc. In one embodiment, a user is instructed to position an imprinter or outliner (e.g., the cut-out shape) on a surface, form a cake-shaping object around the shape, remove the imprinter or outliner, pour batter over the surface within the region defined at least partly by the object. In one embodiment, a user is instructed to position an imprinter (e.g., the cut-out shape) on a compressible mat, push on the imprinter to compress an area of the mat, remove the imprinter, and pour batter in the compressed region.

The program or computer readable medium may be available online or on a network (e.g., the Internet). A computer implemented system may include a computing environment, storage in data communication with the computing environment and configured to store original, modified and/or rescaled shapes, and the program or computer readable medium, wherein the program or computer readable medium operates on the computing environment.

Various kits may be provided including one or more products described herein. For example, a cake-shaping kit may include a cake-shaping object (e.g., a cake-shaping strip) and a mat (e.g., a compressible mat); a mat and one or more imprinters/outliners; a cake-shaping object and one or more imprinters/outliners; or a cake-shaping object, a mat and one or more imprinters/outliners. The one or more imprinters/outliners may comprise a set of imprinters/outliners corresponding to common cake shapes (e.g., numbers, a heart, a Christmas tree, etc.) or a custom set of imprinters/outliners (e.g., based on a selection of a client, e.g., over the Internet, phone, etc.). In some instances, a kit (such as one described above or one including any or all of: a cake-shaping object, a mat and one or more imprinters/outliners) may include an authorization (e.g., an access code, coupon code, html link, etc.) that allows a user to create one or more of her own imprinters and/or outliners over the Internet (e.g., by selecting amongst existing options, by selecting amongst existing shapes and identifying a specific size, by inputting her own shape (e.g., by drawing a shape or uploading an image), etc.).

In some embodiments, information may be provided (e.g., concomitantly provided) with an object (e.g., cake-shaping object), mat and/or one or more imprinters or outliners, or a kit including one or more thereof. The information can be associated with a package (e.g., a container), for example, by being: written on a label adhesively affixed to a package; included inside a package as a written package insert, such as inside a box which contains an object and/or mat; applied directly to the package such as being printed on the wall of a box; or attached as by being tied or taped, for example as an instructional card affixed to the neck of a bottle via a string, cord or other line, lanyard or tether type device.

The information may indicate a process step or a characteristic associated with the object, mat and/or imprinter or outliner. For example, the information may indicate that the object is bendable and/or may be formed into a shape. The information may indicate that a food item (e.g., a batter) may be positioned at (e.g., poured or spread onto) a location adjacent to the object and/or mat. The information may indicate that the object may be placed on the mat, whereby the mat may inhibit leaking of a food item underneath the object. The information may indicate that a mat may be compressed. The information may indicate that the object, mat and/or imprinter or outliner may be coated with a coating substance, such as a fat, an oil, a cooking spray, or a flour. The information may indicate how to use an outliner or imprinter. The information may inform a user of how to receive an imprinter or outliner using the Internet (e.g., by downloading a general image-containing file or creating a custom-shaped imprinter or outliner). The information may indicate that the object may be formed into a closed shape. The information may indicate that the object and/or mat is configured to be substantially separable from a food item subsequent to the baking of the food item adjacent to the object or mat.

The information may indicate an objective of the object, mat and/or imprinter or outliner. For example, the information may indicate that a shape of the object (and/or a shape of a compression in the mat) may at least partially determine the shape of a food item (e.g., a baked item). The information may indicate that the object, mat and/or imprinter or outliner may be used while baking a food item, such as a cake, bar cookies, brownies, cupcakes, cookies, a pie, muffins, or a bread.

The information may indicate one or more other steps not specifically recited herein (e.g., steps that that may be performed to produce a desired result, such as any step or process described herein). For example, the information may indicate that the object, mat and/or imprinter or outliner may be covered by a separation layer (e.g., aluminum foil) or coated with a substance (e.g., a cooking spray).

The information may indicate instructions for baking a cake using the object, mat and/or imprinter or outliner. These instructions may correspond to any of the embodiments described herein. For example, the information may indicate that an imprinter or outliner may be positioned over the mat, that the object may be shaped around the imprinter or outliner, that the object may be pushed downwards into the mat, creating a compressed perimeter, that the area inside the perimeter may be compressed, that the object and mat may be coated with cooking spray, that a cake batter may be poured into the compressed region, that the batter (object and mat) may be baked, and/or that the baked batter (e.g., a cake) may then be separated from the object and mat.

The information may indicate instructions for modifying a recipe while using the moldable substance or strip. For example, the information may indicate that the baking time should be increased, that a baking temperature should be changed, and/or that an amount of a fat (e.g., an oil) or a liquid used in the recipe should be changed. The information may indicate further instructions, such as a cooling time after baking, after which an object may be separated from a food item or food item from a mat or a technique for separating the food item from the object, mat and/or imprinter or outliner.

Tools for forming specific shapes may accompany an object or mat (and, e.g., may be included in a kit). An adhesion tool may be used to connect or help connect a strip to another portion of the strip, to another strip, to an underlying surface and/or to a mat. For example, the adhesion tool may comprise a paste that can be applied to a first strip end, such that a second strip end will attach to the first strip end after contacting the applied paste.

The object, mat and/or imprinter or outliner may be provided with a cooking container (e.g., a cake pan or sheet pan). For example, a cake pan or cookie sheet may be sold with a mat and/or one or more imprinters or outliners sized to fit within the cake pan or cookie sheet.

Embodiments described herein may relate to a food item, such as a food item positioned above or on a mat and/or a food item positioned within a shape at least partly defined by an object. The food item may be an item that will transform into a final food item after a cooking process (e.g., baking, heating, cooling, freezing, or letting stand for a time period). For example, the food item may comprise a dough, batter, mixture, or melted substance that may be transformed into a cake, cookie, pie, gelatin dessert, bread or frozen dessert subsequent to baking or freezing. The food item may be a liquid, e.g. that transforms into a solid state after baking, cooling, expiration of a setting time period, cooling, freezing, etc.

Many variations of any method described herein are contemplated. A method (e.g., a method illustrated in a figure) may be modified to add or omit steps or parts or to rearrange steps or parts. Embodiments referring to "batter" or "cake batter" may be extended to apply to other food items (e.g., non-final food items that will undergo a transformation). Embodiments referring to a "cake" may be extended to apply to other food items (e.g., final food items that, e.g., have undergone a transformation). Embodiments referring to strip or a cake-shaping strip may be extended to apply to other objects (e.g., other shaping objects, other shaping strips, other cake-shaping objects, other food-shaping objects, food molds, etc.).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for making a food item, the method comprising:
    compressing a portion of a compressible mat,
        wherein the mat includes a bottom layer, an interior layer and a top layer,
        wherein, in an uncompressed state, at least 50%, by volume, of the interior layer is air,
        wherein the interior layer includes a plurality of supporting elements,
        wherein the compressing causes at least one supporting element of the plurality of supporting elements to at least partly compress, collapse or move; and
        wherein at least part of each of the at least one supporting element of the plurality of supporting elements is one positioned, at least prior to the applying the downwards force, at the portion of the mat that is compressed;
    pouring a food-item liquid over a region, the region being defined by the compressed portion or including the compressed portion;
    subjecting the food-item liquid and the mat to a processing, the processing transforming the food-item liquid into a food-item solid; and
    separating the processed food-item liquid from the mat, wherein the processed food-item liquid comprises a shape similar to the compressed region.

2. The method of claim 1, wherein the food-item liquid is a batter.

3. The method of claim 1, further comprising:
    shaping, prior to the processing, an object along the portion of the mat, wherein the portion of the mat is compressed in response to an application of a downwards force on the object,
    wherein the portion of the mat defines a perimeter of the region.

4. The method of claim 3, wherein the object comprises a strip, and wherein shaping the object along the portion of the mat includes positioning an edge of the strip on the portion of the mat.

5. The method of claim 4, wherein the strip comprises a plurality of vertical supports.

6. The method of claim 3, wherein the processed food-item liquid comprises a cake and the food-item liquid comprises cake batter.

7. The method of claim 1, wherein the processing comprises baking.

8. The method of claim 1, wherein the compressible mat comprises aluminum.

9. The method of claim 1, wherein the mat is compressible at least partly due to a packing of a material.

10. A system for baking a cake, the system comprising:
a flexible strip configured to be bent by hands of a user from an initial shape into a subsequent shape; and
a compressible mat configured to be locally compressed, such that, upon the user applying a downwards force on the flexible strip when an edge of the flexible strip is positioned on the mat, a portion of the mat under the edge compresses thereby forming a crevice in the mat,
wherein the mat includes a bottom layer, an interior layer and a top layer,
wherein, in an uncompressed state, at least 50%, by volume, of the interior layer is air,
wherein the interior layer includes a plurality of supporting elements,
wherein the user applying the downwards force on the flexible strip causes at least one supporting element of the plurality of supporting elements to at least partly compress, collapse or move, and
wherein at least part of each of the at least one supporting element of the plurality of supporting elements is one positioned, at least prior to the applying the downwards force, at the portion of the mat under the edge of the flexible strip.

11. The system of claim 10, wherein the flexible strip comprises a plurality of vertical supports, wherein positions of the vertical supports relative to each other when the flexible strip is in the initial shape is different than positions of the vertical supports relative to each other when the flexible strip is in the subsequent shape.

12. The system of claim 10, wherein a surface of the flexible strip is food-safe and wherein a surface of the top layer of the compressible mat is food safe.

13. The system of claim 10, wherein a width of the crevice is 0-3 cm wider than a thickness of the flexible strip.

14. The system of claim 10, wherein the subsequent shape is a closed shape and wherein the compressible mat is further configured to be compressed, such that, upon the user applying a downwards force on a top surface of the mat along an area inside the closed shape, a second portion of the mat corresponding to the area is compressed.

15. The system of claim 10, wherein a difference between a height of a second portion of the mat and a height of the portion of the mat is 0.25-5 cm, the second portion of the mat being uncompressed.

16. The system of claim 10, wherein the plurality of supporting elements includes a plurality of layers, and wherein the user applying the downwards force on the flexible strip causes the at least one supporting element of the plurality of supporting elements to at least partly compress, collapse or move by reducing a space between the plurality of layers at the portion of the mat under the edge of the flexible strip.

17. The system of claim 10, wherein the plurality of supporting elements includes a plurality of supports, and wherein the user applying the downwards force on the flexible strip causes the at least one supporting element of the plurality of supporting elements to at least partly compress, collapse or move by causing at least one support of the plurality of supports to compress, deform, break or at least partly collapse.

18. The system of claim 10, wherein the plurality of supporting elements includes a plurality of granules, and wherein the user applying the downwards force on the flexible strip causes the at least one supporting element of the plurality of supporting elements to at least partly compress, collapse or move by causing at least some granules of the plurality of granules to move.

19. The method of claim 1, wherein the plurality of supporting elements includes a plurality of supports, and wherein the compressing causes the at least one supporting element of the plurality of supporting elements to at least partly compress, collapse or move by causing at least one support of the plurality of supports to compress, deform, break or at least partly collapse.

20. The method of claim 1, wherein the plurality of supporting elements includes a plurality of granules, and wherein the compressing causes the at least one supporting element of the plurality of supporting elements to at least partly compress, collapse or move by causing at least some granules of the plurality of granules to move.

* * * * *